US012786055B2

(12) United States Patent
Yamane et al.

(10) Patent No.: US 12,786,055 B2
(45) Date of Patent: Nov. 3, 2026

(54) MANAGEMENT DEVICE, VEHICLE COMMUNICATION MANAGEMENT METHOD, AND STORAGE MEDIUM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Ryo Yamane, Osaka (JP); Tatsuya Izumi, Osaka (JP); Hideyuki Tanaka, Osaka (JP); Yusuke Yamamoto, Osaka (JP); Yoshio Ito, Osaka (JP); Kenta Ogata, Osaka (JP); Yoshitaka Kikuchi, Yokkaichi (JP); Darmawan Go, Yokkaichi (JP); Hirofumi Urayama, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 30 days.

(21) Appl. No.: 19/099,584

(22) PCT Filed: May 23, 2023

(86) PCT No.: PCT/JP2023/019126

§ 371 (c)(1),
(2) Date: Jan. 29, 2025

(87) PCT Pub. No.: WO2024/029166

PCT Pub. Date: Feb. 8, 2024

(65) Prior Publication Data

US 2026/0046202 A1 Feb. 12, 2026

(30) Foreign Application Priority Data

Aug. 2, 2022 (JP) ................................ 2022-123582

(51) Int. Cl.
*H04L 41/0806* (2022.01)
*H04L 67/12* (2022.01)

(52) U.S. Cl.
CPC .......... *H04L 41/0806* (2013.01); *H04L 67/12* (2013.01)

(58) Field of Classification Search
None
See application file for complete search history.

(56) References Cited

U.S. PATENT DOCUMENTS 10,372,903 B2 * 8/2019 Ujiie ....................... G06F 13/36
10,489,141 B2 * 11/2019 Nakamura ......... G05B 19/0426
(Continued)

FOREIGN PATENT DOCUMENTS

JP 2003-078537 A 3/2003
JP 2010-191953 A 9/2010
JP 2020-141318 A 9/2020

OTHER PUBLICATIONS

Aug. 8, 2023 International Search Report issued in International Patent Application No. PCT/JP2023/019126.

*Primary Examiner* — Backhean Tiv
(74) *Attorney, Agent, or Firm* — Oliff PLC

(57) ABSTRACT

A management device that includes a processor that is configured to: detect addition of a functional unit to a network including one or more in-vehicle functional units; acquire functional unit information of the one or more in-vehicle functional units, acquire target information which is functional unit information of a new functional unit which is the functional unit whose addition was detected, and, when the target information cannot be acquired from the
(Continued)

new functional unit, transmit candidate information indicating a candidate for the target information and acquire the target information by receiving a selection result indicating a candidate indicated by the candidate information; and generate configuration information for a new network which is the network further including the new functional unit, based on the functional unit information acquired.

14 Claims, 19 Drawing Sheets

(56) References Cited

U.S. PATENT DOCUMENTS

| | | | | |
|---|---|---|---|---|
| 11,956,314 | B2 * | 4/2024 | Yamamoto | H04L 12/28 |
| 12,074,766 | B2 * | 8/2024 | Yamasaki | H04L 41/0863 |
| 12,289,200 | B2 * | 4/2025 | Mifsud | G06F 9/45533 |
| 12,489,814 | B2 * | 12/2025 | Yamamoto | H04L 12/28 |
| 2019/0342989 | A1 * | 11/2019 | Toyama | B60R 16/02 |
| 2019/0394065 | A1 * | 12/2019 | Okubo | H04L 12/28 |
| 2021/0397433 | A1 * | 12/2021 | Itatsu | H04L 67/34 |
| 2021/0400452 | A1 * | 12/2021 | Baba | H04L 45/645 |
| 2022/0158900 | A1 * | 5/2022 | Yamamoto | H04L 12/28 |
| 2022/0167229 | A1 * | 5/2022 | Chou | H04W 24/02 |
| 2022/0183052 | A1 * | 6/2022 | Yamamoto | H04L 12/28 |
| 2023/0033167 | A1 * | 2/2023 | Sakurai | G06F 8/65 |
| 2024/0223660 | A1 * | 7/2024 | Yamamoto | H04L 12/28 |
| 2026/0046202 | A1 * | 2/2026 | Yamane | H04L 41/0806 |

* cited by examiner

| CONFIGURATION ID | VEHICLE MANUFACTURER | MODEL | IDS OF APPLICATIONS IN EXISTING NETWORK | IDS OF APPLICATIONS TO BE ADDED | SUCCESS/FAILURE INFORMATION |
|---|---|---|---|---|---|
| 00001 | COMPANY A | aaaa | ID-A, ID-B, ID-C | ID-G | SUCCESS |
| 00002 | COMPANY A | aaaa | | ID-H | SUCCESS |
| 00003 | COMPANY A | aaaa | | ID-I | SUCCESS |
| 00004 | COMPANY A | aaaa | | ID-G, ID-H | SUCCESS |
| 00005 | COMPANY A | aaaa | | ID-G, ID-I | FAILURE |
| 00006 | COMPANY A | aaaa | | ID-H, ID-I | FAILURE |
| 00007 | COMPANY A | aaaa | | ID-G, ID-H, ID-I | NONE (UNVERIFIED) |
| 00008 | COMPANY A | bbbb | | ID-G | SUCCESS |
| 00009 | COMPANY A | bbbb | | ID-H | SUCCESS |
| 00010 | COMPANY A | bbbb | | ID-I | SUCCESS |
| 00011 | COMPANY A | bbbb | | ID-G, ID-H | FAILURE |
| 00012 | COMPANY A | bbbb | | ID-G, ID-I | NONE (UNVERIFIED) |
| 00013 | COMPANY A | bbbb | | ID-H, ID-I | NONE (UNVERIFIED) |
| 00014 | COMPANY A | bbbb | | ID-G, ID-H, ID-I | FAILURE |
| 00015 | COMPANY B | aaaa | | ID-G | SUCCESS |
| 00016 | COMPANY B | aaaa | | ID-H | SUCCESS |
| 00017 | COMPANY B | aaaa | | ID-I | SUCCESS |
| 00018 | COMPANY B | aaaa | | ID-G, ID-H | FAILURE |
| ⋮ | ⋮ | ⋮ | ⋮ | ⋮ | ⋮ |
| 00101 | COMPANY A | aaaa | ID-A, ID-B, ID-D | ID-E | SUCCESS |
| 00102 | COMPANY A | aaaa | | ID-F | SUCCESS |
| 00103 | COMPANY A | aaaa | | ID-G | NONE (UNVERIFIED) |
| ⋮ | ⋮ | ⋮ | ⋮ | ⋮ | ⋮ |
| 00218 | COMPANY C | cccc | ID-A, ID-B | ID-C | FAILURE |
| 00219 | COMPANY C | cccc | | ID-D | FAILURE |
| 00220 | COMPANY C | cccc | | ID-C, ID-D | SUCCESS |
| ⋮ | ⋮ | ⋮ | ⋮ | ⋮ | ⋮ |

FIG. 9

| CONFIGURATION ID | HARDWARE DEVICE | PORT NUMBER | VID |
|---|---|---|---|
| 00001 | TCU111A | 1 | VLAN10 |
| 00001 | INTAKE SENSOR 111B | 1 | VLAN20 |
| 00001 | ENGINE ECU 111C | 1 | VLAN20 |
| 00001 | TEMPERATURE SENSOR 111D | 1 | VLAN30 |
| 00001 | WATER TEMPERATURE SENSOR 111E | 1 | VLAN30 |
| 00001 | RELAY DEVICE 112 | 1 | VLAN10 |
| 00001 | RELAY DEVICE 112 | 2 | VLAN20 |
| 00001 | RELAY DEVICE 112 | 3 | VLAN20, VLAN30 |
| 00001 | IMAGE SENSOR 111G | 1 | VLAN20 |
| 00002 | TCU111A | 1 | VLAN10 |
| 00002 | INTAKE SENSOR 111B | 1 | VLAN20 |
| | ⋮ | ⋮ | ⋮ |
| 00101 | TCU111A | 1 | VLAN10 |
| 00101 | INTAKE SENSOR 111B | 1 | VLAN20 |
| 00101 | ENGINE ECU 111C | 1 | VLAN20 |
| | ⋮ | ⋮ | ⋮ |

FIG. 10

NETWORK PROVISIONAL CONFIGURATION INFORMATION

| | | |
|---|---|---|
| COMPANY A | aaaa | ID-A , ID-B , ID-C |

FIG. 12

CL

| CONFIGURATION ID | VEHICLE MANUFACTURER | MODEL | IDS OF APPLICATIONS IN EXISTING NETWORK | IDS OF APPLICATIONS TO BE ADDED | SUCCESS/FAILURE INFORMATION |
|---|---|---|---|---|---|
| 00001 | COMPANY A | aaaa | ID-A, ID-B, ID-C | ID-G | SUCCESS |
| 00002 | COMPANY A | aaaa | | ID-H | SUCCESS |
| 00003 | COMPANY A | aaaa | | ID-I | SUCCESS |
| 00004 | COMPANY A | aaaa | | ID-G, ID-H | SUCCESS |
| 00005 | COMPANY A | aaaa | | ID-G, ID-I | FAILURE |
| 00006 | COMPANY A | aaaa | | ID-H, ID-I | FAILURE |
| 00007 | COMPANY A | aaaa | | ID-G, ID-H, ID-I | NONE (UNVERIFIED) |
| 00008 | COMPANY A | bbbb | | ID-G | SUCCESS |
| 00009 | COMPANY A | bbbb | | ID-H | SUCCESS |
| 00010 | COMPANY A | bbbb | | ID-I | SUCCESS |
| 00011 | COMPANY A | bbbb | | ID-G, ID-H | FAILURE |
| 00012 | COMPANY A | bbbb | | ID-G, ID-I | NONE (UNVERIFIED) |
| 00013 | COMPANY A | bbbb | | ID-H, ID-I | NONE (UNVERIFIED) |
| 00014 | COMPANY A | bbbb | | ID-G, ID-H, ID-I | FAILURE |
| 00015 | COMPANY B | aaaa | | ID-G | SUCCESS |
| 00016 | COMPANY B | aaaa | | ID-H | SUCCESS |
| 00017 | COMPANY B | aaaa | | ID-I | SUCCESS |
| 00018 | COMPANY B | aaaa | | ID-G, ID-H | FAILURE |
| ⋮ | ⋮ | ⋮ | ⋮ | ⋮ | ⋮ |
| 00101 | COMPANY A | aaaa | ID-A, ID-B, ID-D | ID-E | SUCCESS |
| 00102 | COMPANY A | aaaa | | ID-F | SUCCESS |
| 00103 | COMPANY A | aaaa | | ID-G | NONE (UNVERIFIED) |
| ⋮ | ⋮ | ⋮ | ⋮ | ⋮ | ⋮ |
| 00218 | COMPANY C | cccc | ID-A, ID-B | ID-C | FAILURE |
| 00219 | COMPANY C | cccc | | ID-D | FAILURE |
| 00220 | COMPANY C | cccc | | ID-C, ID-D | SUCCESS |
| ⋮ | ⋮ | ⋮ | ⋮ | ⋮ | ⋮ |

FIG. 13

NEW NETWORK CONFIGURATION INFORMATION

| | | | |
|---|---|---|---|
| COMPANY A | aaaa | ID-A, ID-B, ID-C | ID-G |

FIG. 15

MANAGEMENT DEVICE, VEHICLE COMMUNICATION MANAGEMENT METHOD, AND STORAGE MEDIUM

BACKGROUND

The present disclosure relates to a management device, a vehicle communication management method, and a storage medium. This application is based upon and claims the benefit of priority from Japanese Patent Application No. 2022-123582 filed on Aug. 2, 2022, the entire content of which is hereby incorporated by reference.

Technologies for changing the settings of the configurations of in-vehicle networks have been developed. For example, technology such as the following is disclosed in WO 2020/179124A. A management device includes: a detection unit that detects the addition of a functional unit to a network including one or more in-vehicle functional units; a generation unit that acquires functional unit information of a new functional unit, which is the functional unit whose addition was detected by the detection unit, and functional unit information of the one or more in-vehicle functional units, and generates configuration information for a new network, which is the aforementioned network further including the new functional unit, based on the acquired functional unit information; and an acquisition unit that acquires, from a database in a storage device, feasibility information corresponding to the configuration information generated by the generation unit, the feasibility information indicating the feasibility of the new network.

SUMMARY

A management device according to an aspect of the present disclosure includes: a processor that is configured to: detect addition of a functional unit to a network including one or more in-vehicle functional units; acquire functional unit information of the one or more in-vehicle functional units, acquire target information which is functional unit information of a new functional unit which is the functional unit whose addition was detected, and, when the target information cannot be acquired from the new functional unit, transmit candidate information indicating a candidate for the target information and acquire the target information by receiving a selection result indicating a candidate indicated by the candidate information; and generate configuration information for a new network which is the network further including the new functional unit, based on the functional unit information acquired.

Aspects of the present disclosure may be realized as a semiconductor integrated circuit that realizes part or all of the management device, or may be realized as a system that includes the management device.

BRIEF DESCRIPTION OF THE DRAWINGS

FIG. 9 is a diagram illustrating an example of a success/failure database stored in a storage device in the communication system according to the embodiment of the present disclosure.

FIG. 10 is a diagram illustrating an example of a setting database stored in the storage device in the communication system according to the embodiment of the present disclosure.

FIG. 12 is a diagram illustrating an example of provisional configuration information of a network generated by the management unit according to the embodiment of the present disclosure.

FIG. 13 is a diagram illustrating an example of candidate information generated by the management unit according to the embodiment of the present disclosure.

FIG. 15 is a diagram illustrating an example of configuration information for a new network generated by the management unit according to the embodiment of the present disclosure.

DETAILED DESCRIPTION OF EMBODIMENTS

Technical Problem

Figure 1:
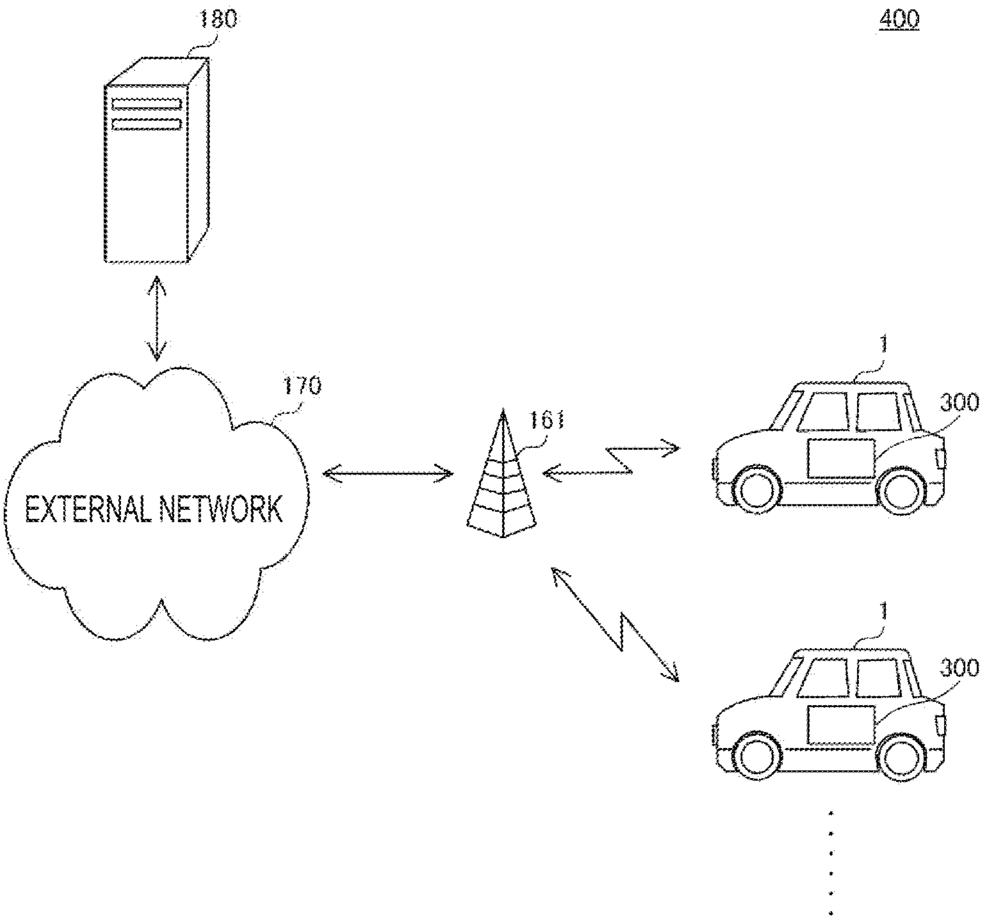
FIG. 1 is a diagram illustrating a configuration of a communication system according to an embodiment of the present disclosure.

In the technology described in WO 2020/179124A, the new functional unit has a function of transmitting functional unit information. However, for example, if an in-vehicle ECU (Electronic Control Unit) added to an in-vehicle network does not have such a function, it is difficult for the management device to generate configuration information for the new network.

An exemplary aspect of the disclosure provides a management device, a vehicle communication management method, and a vehicle communication management program that are capable of more reliably constructing a network having a new configuration including in-vehicle functional units.

Advantageous Effects of the Present Disclosure

According to the present disclosure, a network having a new configuration including in-vehicle functional units can be constructed more reliably.

Summary of the Embodiments of the Present Disclosure

First, the content of embodiments of the present disclosure will be listed and described.

(1) A management device according to an embodiment of the present disclosure includes: a detection unit configured to detect addition of a functional unit to a network including one or more in-vehicle functional units; an acquisition unit configured to acquire functional unit information of the one or more in-vehicle functional units, acquire target information which is functional unit information of a new functional unit which is the functional unit whose addition was detected by the detection unit, and, in a case in which the target information cannot be acquired from the new functional unit, transmit candidate information indicating a candidate for the target information and acquire the target information by receiving a selection result indicating a candidate indicated by the candidate information; and a generation unit configured to generate configuration information for a new network which is the network further including the new functional unit, based on the functional unit information acquired by the acquisition unit.

According to this configuration, even if the new functional unit added to the network does not have a function of transmitting functional unit information, such functional unit information can be generated using selection information indicating a selection of candidate information, and configuration information for the new network can be generated. Therefore, a network having a new configuration that includes the in-vehicle functional units can be constructed more reliably. Furthermore, compared to a configuration in which the functional unit information is generated by free input from a user, the above configuration makes it possible to reduce the input burden on the user and prevent increased complexity in processing for handling input errors, for example.

(2) In (1) above, the acquisition unit may acquire the candidate information that is based on the acquired functional unit information of the one or more in-vehicle functional units.

According to this configuration, it is possible to acquire appropriate candidate information using the functional unit information of existing functional units in the network.

(3) In (2) above, the acquisition unit may generate provisional configuration information for the network based on the functional unit information of the one or more in-vehicle functional units acquired by the acquisition unit, and acquire the candidate information that is based on the provisional configuration information and feasibility information indicating a feasibility of the new network.

According to this configuration, verification results regarding network feasibility that have been generated in advance can be used to easily infer the functional unit information of a new functional unit that has a possibility of being connected to a new network.

(4) In (3) above, the feasibility information may be information indicating a plurality of combinations of the functional unit information of the one or more in-vehicle functional units, the functional unit information of the new functional unit, and the feasibility of the new network, and the acquisition unit may acquire the candidate information that is based on the functional unit information of the new functional unit corresponding to the provisional configuration information in the feasibility information.

According to this configuration, it is possible to generate candidate information through simple processing using a list of pieces of feasibility information.

(5) In any of (2) to (4) above, the acquisition unit may acquire the candidate information that is further based on an added position at which the new functional unit is to be added to the network.

According to this configuration, the added position in the network can be used to further narrow down candidates and generate more appropriate candidate information, and it is possible to reduce the burden on the user when selecting target information.

(6) In any of (1) to (5) above, the management device may further include: a setting processing unit configured to acquire, from a database in a storage device, feasibility information corresponding to the configuration information generated for the new network by the generation unit, the feasibility information indicating a feasibility of the new network.

According to this configuration, a new network can be constructed using verification results regarding network feasibility that have been generated in advance. This makes it possible to construct a new network whose feasibility is guaranteed in terms of, for example, logical configuration and physical configuration, thereby making it possible to suppress a delay in important communication that may arise due to, for example, adding a new functional unit to the network.

(7) A vehicle communication management method according to an embodiment of the present disclosure is a vehicle communication management method to be used in a management device, the method including the steps of: detecting addition of a functional unit to a network including one or more in-vehicle functional units; acquiring functional unit information of the one or more in-vehicle functional units, acquiring target information which is functional unit information of a new functional unit which is the functional unit whose addition was detected, and, in a case in which the target information cannot be acquired from the new functional unit, transmitting candidate information indicating a candidate for the target information and acquiring the target information by receiving a selection result indicating a candidate indicated by the candidate information; and generating configuration information for a new network which is the network further including the new functional unit, based on the acquired functional unit information.

According to this configuration, even if the new functional unit added to the network does not have a function of transmitting functional unit information, such functional unit information can be generated using selection information indicating a selection of candidate information, and configuration information for the new network can be generated. Therefore, a network having a new configuration that includes the in-vehicle functional units can be constructed more reliably. Furthermore, compared to a configuration in which the functional unit information is generated by free input from a user, the above configuration makes it possible to reduce the input burden on the user and prevent increased complexity in processing for handling input errors, for example.

(8) A vehicle communication management program according to an embodiment of the present disclosure is a vehicle communication management program to be used in a management device, the program causing a computer to function as: a detection unit configured to detect addition of a functional unit to a network including one or more in-vehicle functional units; an acquisition unit configured to acquire functional unit information of the one or more in-vehicle functional units, acquire target information which is functional unit information of a new functional unit which is the functional unit whose addition was detected by the detection unit, and, in a case in which the target information cannot be acquired from the new functional unit, transmit candidate information indicating a candidate for the target information and acquire the target information by receiving a selection result indicating a candidate indicated by the candidate information; and a generation unit configured to generate configuration information for a new network which is the network further including the new functional unit, based on the functional unit information acquired by the acquisition unit.

According to this configuration, even if the new functional unit added to the network does not have a function of transmitting functional unit information, such functional unit information can be generated using selection information indicating a selection of candidate information, and configuration information for the new network can be generated. Therefore, a network having a new configuration that includes the in-vehicle functional units can be constructed more reliably. Furthermore, compared to a configuration in which the functional unit information is generated by free input from a user, the above configuration makes it possible to reduce the input burden on the user and prevent increased complexity in processing for handling input errors, for example.

Details of Embodiments of the Present Disclosure

Hereinafter, embodiments of the present disclosure will be described with reference to the drawings. Note that the same reference numerals are given to the same or corresponding portions in the drawings, and description thereof will not be repeated. In addition, at least some of the embodiments described below can be combined as desired.

Communication System

FIG. 1 is a diagram illustrating the configuration of a communication system according to an embodiment of the present disclosure.

As shown in FIG. 1, a communication system 400 includes a server 180 and one or more vehicle communication systems 300. The vehicle communication systems 300 are implemented in vehicles 1.

Figure 2:
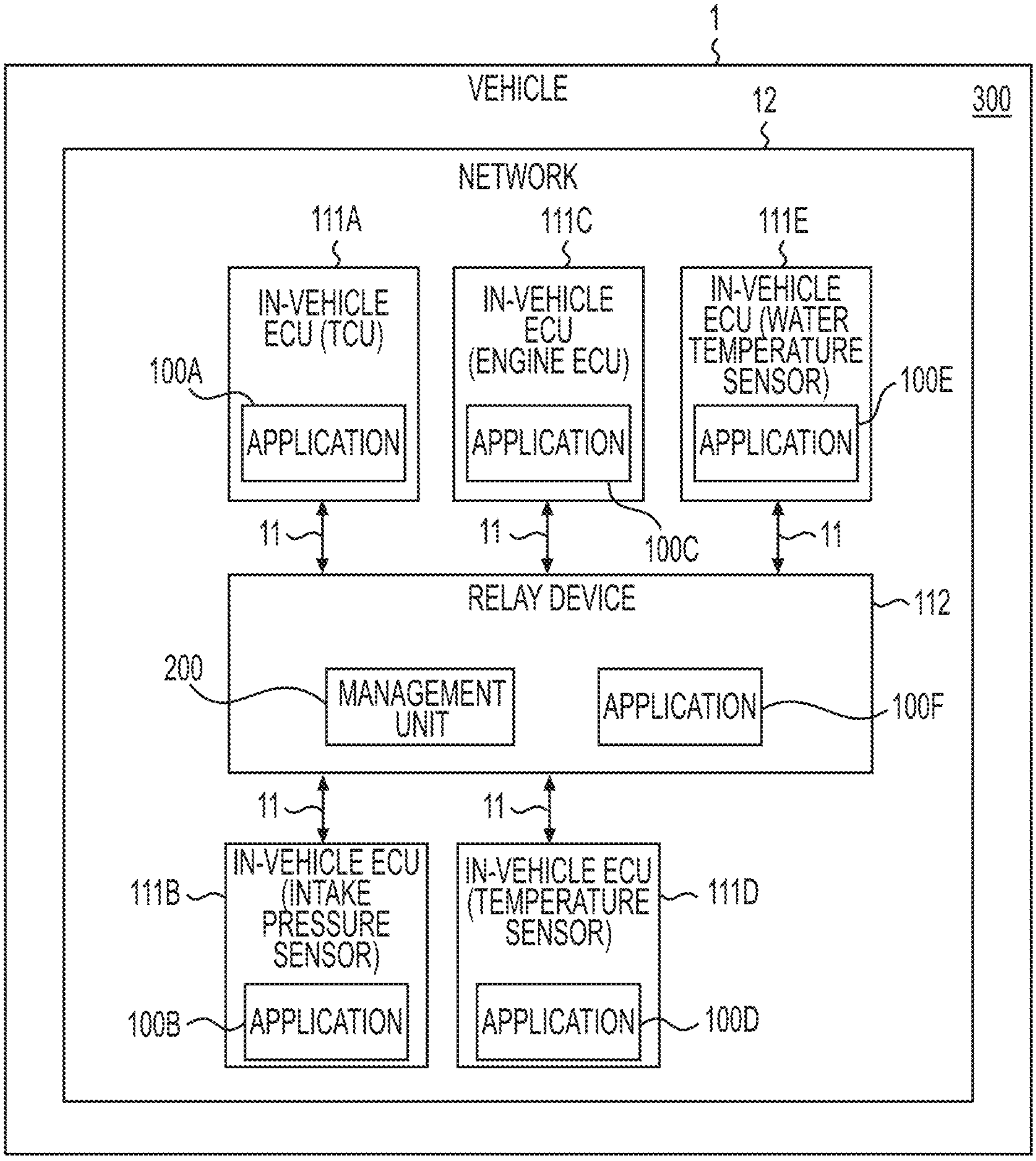
FIG. 2 is a diagram illustrating an example of a configuration of a vehicle communication system according to the embodiment of the present disclosure.

FIG. 2 is a diagram illustrating an example of the configuration of the vehicle communication system according to the embodiment of the present disclosure.

As shown in FIG. 2, the vehicle communication system 300 includes one or more in-vehicle ECUs (Electronic Control Units) 111 and a relay device 112. Specifically, as the in-vehicle ECUs 111, the vehicle communication system 300 includes in-vehicle ECUs 111A, 111B, 111C, 111D, and 111E. The relay device 112 includes a management unit 200.

The in-vehicle ECUs 111A, 111B, 111C, 111D, and 111E and the relay device 112 each include an application 100.

More specifically, as the applications 100, the in-vehicle ECU 111A includes an application 100A, the in-vehicle ECU 111B includes an application 100B, the in-vehicle ECU 111C includes an application 100C, the in-vehicle ECU 111D includes an application 100D, the in-vehicle ECU 111E includes an application 100E, and the relay device 112 includes an application 100F.

The in-vehicle ECUs 111A, 111B, 111C, 111D, and 111E and the relay device 112 constitute a network 12.

The in-vehicle ECUs 111 and the applications 100 are examples of in-vehicle functional units implemented in the vehicle 1, among functional units (i.e., objects) in the network 12. The relay device 112 is an example of a management device.

The vehicle communication system 300 is not limited to a configuration including five in-vehicle ECUs 111, and may include one, two, three, four, or six or more in-vehicle ECUs 111. Furthermore, there is no limitation to a configuration in which one application 100 is provided in one in-vehicle ECU 111, and a configuration is possible in which two or more applications 100 are provided in one in-vehicle ECU 111.

Also, the vehicle communication system 300 is not limited to a configuration including one relay device 112, and may have a configuration including a plurality of relay devices 112. Furthermore, there is no limitation to a configuration in which one application 100 is provided in one relay device 112, and a configuration is possible in which two or more applications 100 are provided in one relay device 112.

The network 12 may also include, as functional units (i.e., objects), external devices outside the vehicle 1 and applications provided in such external devices.

The in-vehicle ECUs 111 are, for example, a TCU (Telematics Communication Unit), an automatic driving ECU, an engine ECU, a sensor, a navigation device, a human machine interface, a camera, or the like.

In this example, the in-vehicle ECUs 111A, 111B, 111C, 111D, and 111E are a TCU, an intake pressure sensor, an engine ECU, a temperature sensor, and a water temperature sensor, respectively.

Hereinafter, the in-vehicle ECUs 111A, 111B, 111C, 111D, and 111E will also be referred to as the TCU 111A, the intake pressure sensor 111B, the engine ECU 111C, the temperature sensor 111D, and the water temperature sensor 111E, respectively.

In the network 12, the in-vehicle ECUs 111A, 111B, 111C, 111D, and 111E are connected to the relay device 112 via Ethernet (registered trademark) cables 11.

The relay device 112 is, for example, a gateway device, and is capable of relaying data between the in-vehicle ECUs 111 connected thereto.

The relay device 112 relays Ethernet frames in accordance with the Ethernet communication standard. Specifically, the relay device 112 relays Ethernet frames exchanged between the in-vehicle ECUs 111, for example. IP packets are stored in the Ethernet frames.

Note that the vehicle communication system 300 is not limited to a configuration in which Ethernet frames are relayed in accordance with the Ethernet communication standard, and may also have a configuration in which data is relayed in accordance with a communication standard such as CAN (Controller Area Network) (registered trademark), CAN FD (CAN with Flexible Data Rate), FlexRay (registered trademark), MOST (Media Oriented Systems Transport) (registered trademark), or LIN (Local Interconnect Network), for example.

As shown in FIGS. 1 and 2, the TCU 111A can perform communication with the server 180. Specifically, the TCU 111A can perform communication with the server 180 via a wireless base station device 161 using, for example, IP packets.

More specifically, the TCU 111A can perform wireless communication with the wireless base station device 161 in accordance with a communication standard such as LTE (Long Term Evolution) or 5G.

Specifically, when the wireless base station device 161 receives IP packets from the server 180 via an external network 170 such as the Internet, the wireless base station device 161 transmits the received IP packets in a wireless signal to the TCU 111A.

For example, when a wireless signal that includes an IP packet from the server 180 is received from the wireless base station device 161, the TCU 111A acquires the IP packet from the received wireless signal, stores the acquired IP packet in an Ethernet frame, and transmits the frame to the relay device 112.

Also, when an Ethernet frame is received from the relay device 112, the TCU 111A acquires an IP packet from the received Ethernet frame, and transmits the acquired IP packet in a wireless signal to the wireless base station device 161.

When a wireless signal is received from the TCU 111A, the wireless base station device 161 acquires an IP packet from the received wireless signal and transmits the acquired IP packet to the server 180 via the external network 170.

The intake pressure sensor 111B can perform communication with other in-vehicle ECUs 111 via the relay device 112, and periodically measures the intake pressure of the engine in the vehicle 1, for example.

The engine ECU 111C can perform communication with other in-vehicle ECUs 111 via the relay device 112, and controls the engine of the vehicle 1, for example.

More specifically, the engine ECU 111C acquires information indicating, for example, the engine speed, the vehicle speed of the vehicle 1, the engine torque, the state of the transmission, the state of the throttle valve, and the measurement values of sensors, and controls the engine based on the acquired information.

Furthermore, the engine ECU 111C can transmit part or all of the acquired information to the relay device 112 in response to a request from the relay device 112, for example.

The temperature sensor 111D can perform communication with other in-vehicle ECUs 111 via the relay device 112, and periodically measures the air temperature outside of the vehicle 1, for example.

The water temperature sensor 111E can perform communication with other in-vehicle ECUs 111 via the relay device 112, and periodically measures the temperature of cooling water circulating in the engine of the vehicle 1, for example.

The applications 100 each perform predetermined processing in the in-vehicle ECU 111 or the relay device 112 in which it is installed, by, for example, performing application layer processing. For example, the application 100D in the temperature sensor 111D generates temperature information indicating the air temperature outside of the vehicle 1 at a predetermined period.

Figure 3:
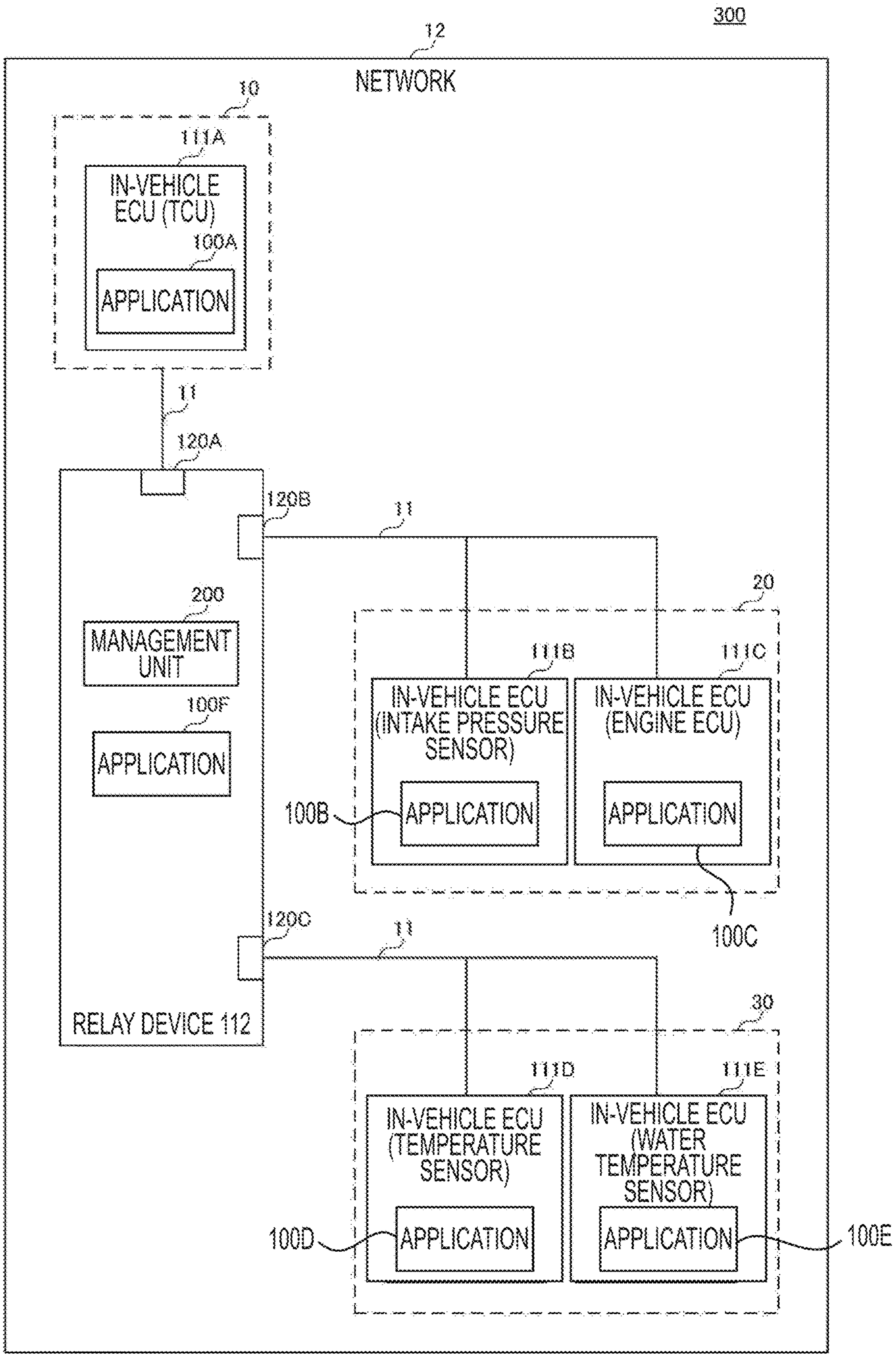
FIG. 3 is a diagram illustrating an example of a network configuration in the vehicle communication system according to the embodiment of the present disclosure.

FIG. 3 is a diagram illustrating an example of the network configuration in the vehicle communication system according to the embodiment of the present disclosure.

As shown in FIG. 3, the relay device 112 includes communication ports 120A, 120B, and 120C. The communication ports 120A, 120B, and 120C will each also be referred to as the communication port 120. Each of the communication ports 120 is, for example, a terminal to which an Ethernet cable 11 can be connected.

In the example shown in FIG. 3, the TCU 111A is connected to the communication port 120A, the intake pressure sensor 111B and the engine ECU 111C are connected to the communication port 120B, and the temperature sensor 111D and the water temperature sensor 111E are connected to the communication port 120C.

Also, in the network 12, the TCU 111A belongs to a virtual local area network (VLAN) 10. The intake pressure sensor 111B and the engine ECU 111C belong to a VLAN 20 that is different from the VLAN 10. The temperature sensor 111D and the water temperature sensor 111E belong to a VLAN 30 that is different from the VLAN 10 and the VLAN 20.

The relay device 112 relays Ethernet frames between in-vehicle ECUs 111 that belong to the same VLAN, for example. Specifically, the relay device 112 refers to a source media access control (MAC) address and a destination MAC address contained in a received Ethernet frame, and transmits the received Ethernet frame to the in-vehicle ECU 111 that is the destination.

Furthermore, the relay device 112 relays IP packets between in-vehicle ECUs 111 that belong to different VLANs, for example. Specifically, the relay device 112 acquires an IP packet from a received Ethernet frame, and, based on the destination IP address of the acquired IP packet, transmits the IP packet to the in-vehicle ECU 111 that is the destination.

Management Unit

Figure 4:
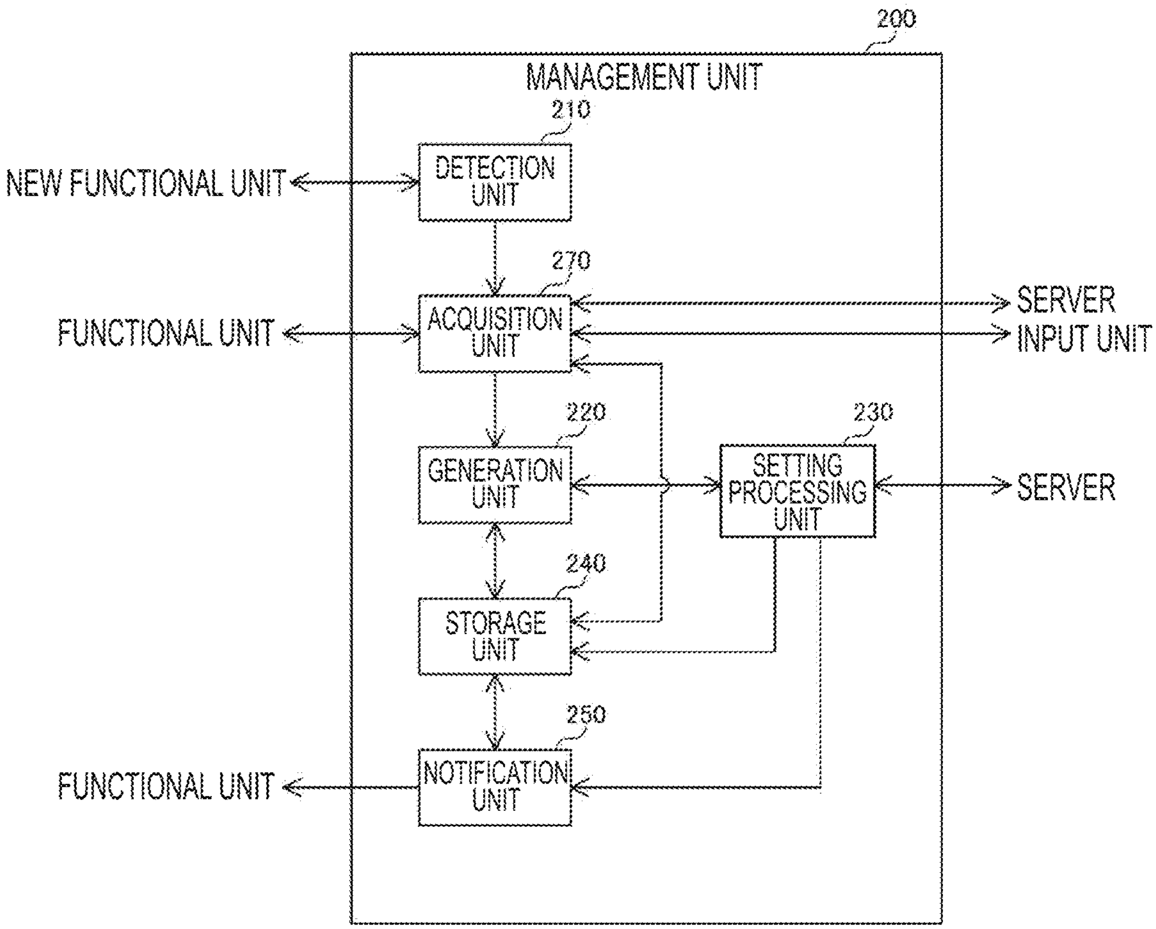
FIG. 4 is a diagram illustrating a configuration of a management unit according to the embodiment of the present disclosure.

FIG. 4 is a diagram illustrating the configuration of the management unit according to the embodiment of the present disclosure.

As shown in FIG. 4, the management unit 200 includes a detection unit 210, a generation unit 220, a setting processing unit 230, a storage unit 240, a notification unit 250, and an acquisition unit 270. Any or all of the detection unit 210, the generation unit 220, the setting processing unit 230, the notification unit 250, and the acquisition unit 270 are realized by, for example, a processing circuit (circuitry) that includes one or more processors. The storage unit 240 is, for example, a non-volatile memory included in the processing circuit.

Detection Unit

The detection unit 210 detects a new functional unit that is newly added to the network 12. In other words, the detection unit 210 detects the addition of a new functional unit to the network 12. More specifically, the detection unit 210 detects the addition of an in-vehicle ECU 111, an external device, an application 100, or the like to the network 12. As one example, the detection unit 210 detects the application 100 of an in-vehicle ECU 111 that is newly added to the network 12 as a new functional unit.

For example, the new functional unit transmits connection request information, which is for requesting a communication connection in the network 12, to the detection unit 210.

The detection unit 210 receives the connection request information and detects the new functional unit that is the source of the connection request information.

Note that the detection unit 210 may be configured to periodically broadcast a search message for detecting a new functional unit, for example. In this case, the new functional unit receives the search message, and transmits the connection request information as a response to the received search message.

Hereinafter, the network 12 that includes the new functional unit will also be referred to as the new network, the network 12 before the new functional unit is added will also be referred to as the existing network, and the functional units included in the existing network will also be referred to as the existing functional units. The in-vehicle ECUs 111 included in the existing network are examples of the existing functional units.

Figure 5:
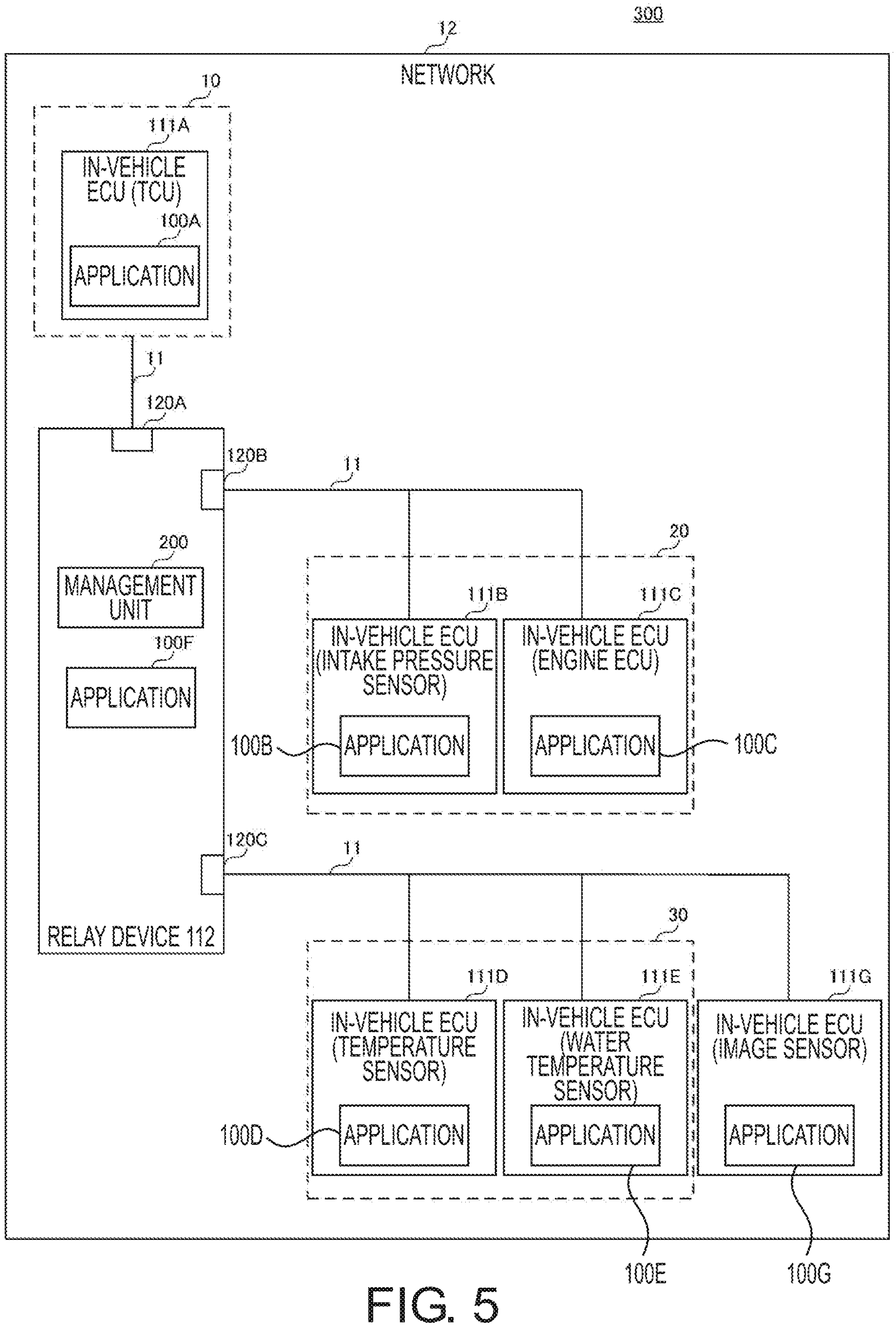
FIG. 5 is a diagram illustrating an example of a configuration of a new network in the vehicle communication system according to the embodiment of the present disclosure.

FIG. 5 is a diagram illustrating an example of the configuration of a new network in the vehicle communication system according to the embodiment of the present disclosure.

As shown in FIG. 5, a case in which an in-vehicle ECU 111G is newly added to the network 12 will be considered. In this example, the in-vehicle ECU 111G is an image sensor. Hereinafter, the in-vehicle ECU 111G will also be referred to as the image sensor 111G. The image sensor 111G includes an application 100G, which is the new functional unit.

When the image sensor 111G receives supply of power and is connected to the communication port 120C of the relay device 112 via the Ethernet cable 11, for example, the image sensor 111G transmits connection request information for requesting a communication connection in the network 12 to the detection unit 210.

More specifically, the application 100G in the image sensor 111G generates an Ethernet frame that includes connection request information, a self-identifying ID, and the MAC address of the relay device 112 as the destination MAC address, and transmits the generated Ethernet frame to the relay device 112.

Upon receiving the Ethernet frame transmitted from the application 100G, the detection unit 210 of the relay device 112 performs authentication processing on the application 100G using the ID and the like included in the received Ethernet frame.

If the authentication of the application 100G is successful, the detection unit 210 generates an Ethernet frame that includes authentication success information, which indicates that the authentication was successful, and the MAC address of the image sensor 111G as the destination MAC address, and transmits the generated Ethernet frame to the image sensor 111G.

Figure 6:
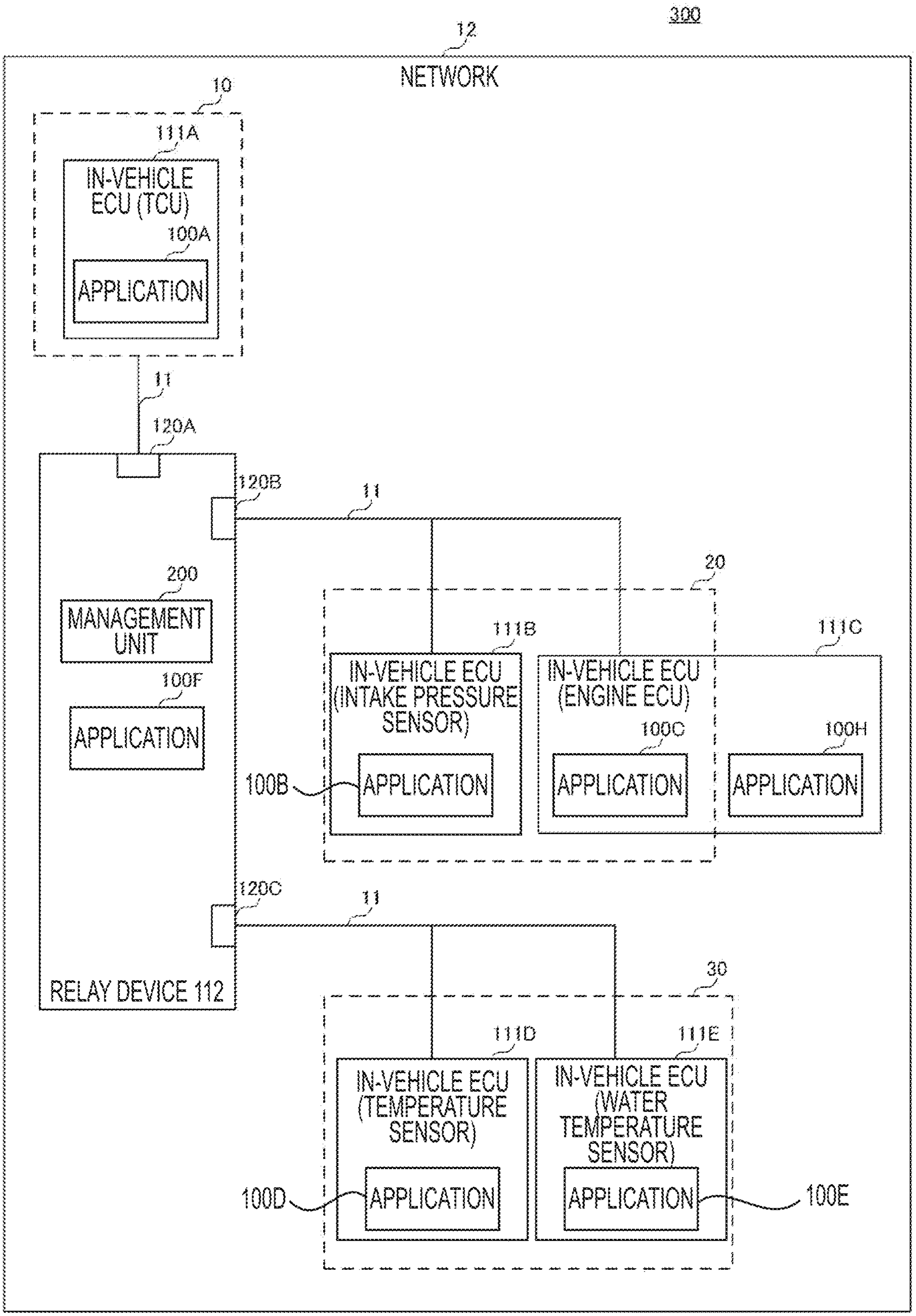
FIG. 6 is a diagram illustrating another example of a configuration of a new network in the vehicle communication system according to the embodiment of the present disclosure.

FIG. 6 is a diagram illustrating another example of the configuration of a new network in the vehicle communication system according to the embodiment of the present disclosure.

The new functional unit detected by the detection unit 210 is not limited to the application 100 included in an in-vehicle ECU 111 newly connected to the relay device 112. For example, the detection unit 210 may be configured to detect, as the new functional unit, an application 100 newly installed in an in-vehicle ECU 111 in the existing network.

As shown in FIG. 6, a case in which an application 100H is newly installed in the network 12 as a new functional unit in the engine ECU 111C, which is an existing functional unit, will be considered.

When the application 100H is installed in the engine ECU 111C, the application 100H generates an Ethernet frame that includes connection request information, a self-identifying ID, and the MAC address of the relay device 112 as the destination MAC address, and transmits the generated Ethernet frame to the relay device 112.

Upon receiving the Ethernet frame transmitted from the application 100H, the detection unit 210 of the relay device 112 performs authentication processing on the application 100H using the ID and the like included in the received Ethernet frame.

If the authentication of the application 100H is successful, the detection unit 210 generates an Ethernet frame that includes authentication success information, which indicates that the authentication was successful, and the MAC address of the engine ECU 111C as the destination MAC address, and transmits the generated Ethernet frame to the engine ECU 111C.

Figure 7:
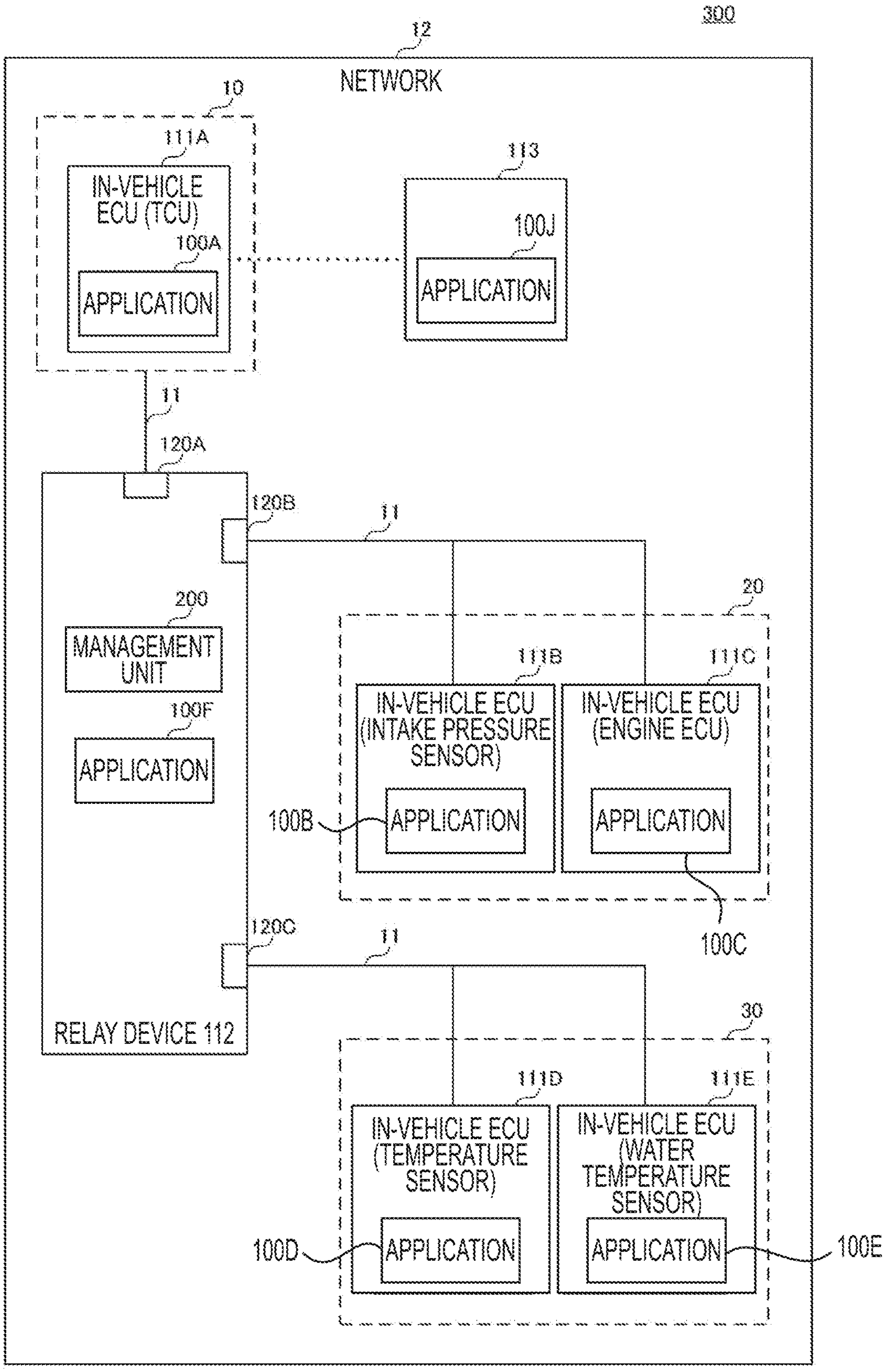
FIG. 7 is a diagram illustrating another example of a configuration of a new network in the vehicle communication system according to the embodiment of the present disclosure.

FIG. 7 is a diagram illustrating another example of the configuration of a new network in the vehicle communication system according to the embodiment of the present disclosure.

The new functional unit detected by the detection unit 210 is not limited to the application 100 included in an in-vehicle ECU 111 newly connected to the relay device 112 or the application 100 installed in an in-vehicle ECU 111 as described above. For example, the detection unit 210 may be configured to detect, as a new functional unit, the application 100 included in an external device 113 that is added to the network 12 outside the vehicle 1.

As shown in FIG. 7, a case in which the external device 113 is newly added to the network 12 will be considered. The external device 113 is a device provided outside the vehicle 1. The external device 113 includes an application 100J, which is the new functional unit.

The external device 113 can perform communication with the TCU 111A. More specifically, the external device 113 can, for example, perform communication with the TCU 111A via the wireless base station device 161 using IP packets.

The external device 113 transmits connection request information for requesting a communication connection in the network 12 to the detection unit 210 via the TCU 111A.

More specifically, the application 100J in the external device 113 transmits an IP packet that includes connection request information, a self-identifying ID, and the MAC address of the relay device 112 to the wireless base station device 161 via the external network 170.

Upon receiving the IP packet from the external device 113 via the external network 170, the wireless base station device 161 transmits the received IP packet in a wireless signal to the TCU 111A.

When the wireless signal including the IP packet from the application 100J is received from wireless base station device 161, the TCU 111A acquires the IP packet from the received wireless signal, generates an Ethernet frame that includes the acquired IP packet and the MAC address of the relay device 112 as the destination MAC address, and transmits the generated Ethernet frame to the relay device 112.

Upon receiving the Ethernet frame from the TCU 111A, the detection unit 210 of the relay device 112 performs authentication processing on the application 100J using the ID and the like included in the IP packet stored in the received Ethernet frame.

If the authentication of the application 100J is successful, the detection unit 210 generates an Ethernet frame that includes authentication success information, which indicates that the authentication was successful, and the MAC address of the external device 113 as the destination MAC address, and transmits the generated Ethernet frame to the TCU 111A.

Upon receiving the Ethernet frame from the detection unit 210, the TCU 111A acquires the IP packet from the received Ethernet frame, and transmits the acquired IP packet in a wireless signal to the external device 113 via the wireless base station device 161.

If the authentication of the new functional unit is successful as described above, the detection unit 210 outputs, to the acquisition unit 270, detection information indicating the ID of the new functional unit, the port number of the corresponding communication port 120, and the like.

Note that in the case where the vehicle communication system 300 includes a plurality of relay devices 112 and an in-vehicle ECU 111 is newly connected to a relay device 112 that does not include the management unit 200, that relay device 112 may be configured to, for example, detect the connection of the in-vehicle ECU 111 by Ethernet link-up, LLDP (Link Layer Discovery Protocol), or the like, and transmit the above-described detection information regarding the new functional unit to the management unit 200 of another relay device 112.

Acquisition Unit

The acquisition unit 270 acquires functional unit information regarding existing functional units and functional unit information regarding new functional units. More specifically, upon receiving detection information from the detection unit 210, the acquisition unit 270 starts processing for acquiring the functional unit information of functional units. The acquisition unit 270 acquires the functional unit information of the new functional unit indicated by the detection information, and also acquires the functional unit information of the existing functional units, and outputs the functional unit information to the generation unit 220.

For example, the acquisition unit 270 acquires, as the functional unit information, information that enables recognition of the topology of hardware devices such as the in-vehicle ECUs 111, the relay device 112, and the external device 113, in the new network. Also, for example, the acquisition unit 270 acquires, as the functional unit information, information that enables recognition of constraints regarding the arrangement of the applications 100 in the hardware devices in the new network. Also, for example, the acquisition unit 270 acquires information that enables recognition of constraints on the communication method between the applications 100.

As information enabling recognition of the topology of the hardware devices, the acquisition unit 270 acquires, for example: vehicle information indicating the manufacturer and the model of the vehicle 1 in which the in-vehicle ECUs 111 and the relay device 112 are installed; additional option information indicating additional options installed in the vehicle 1; an in-vehicle device ID which is an identifier indicating the manufacturer, the serial number, and the like of the in-vehicle ECU 111; the port numbers of the communication ports in the connections between the hardware devices; and information regarding the bandwidth of the communication paths between the hardware devices.

As information that enables recognition of constraints regarding the arrangement of the applications 100 in the hardware devices, the acquisition unit 270 acquires, for example, the IDs of the applications 100.

As information that enables recognition of constraints on the communication method between the applications 100, the acquisition unit 270 acquires, for example, information indicating a communication standard used for communication between the applications 100, such as Ethernet or CAN.

For example, the acquisition unit 270 transmits, to the existing functional units and the new functional unit, an information request notification indicating the types of functional unit information to be transmitted from among the various types of functional unit information described above.

In response to the information request notification received from the acquisition unit 270, the existing functional units and the new functional unit transmit, to the acquisition unit 270, the types of functional unit information specified in the information request notification, for example.

Generation Unit

The generation unit 220 generates configuration information for a new network based on the functional unit information of the existing functional units and the functional unit information of the new functional unit acquired by the acquisition unit 270. The generation unit 220 generates configuration information for the new network based on the functional unit information received from the acquisition unit 270, and outputs the information to the setting processing unit 230.

For example, the generation unit 220 generates, as the configuration information, information capable of specifying the vehicle 1 and the functional units in the new network. Here, as one example, the generation unit 220 generates configuration information indicating a combination of vehicle information, the IDs of the applications 100 in the existing network, and the ID of the application 100 to be added.

Note that the acquisition unit 270 may be configured to acquire configuration information of the existing network as the functional unit information of the existing functional units, and output the acquired information to the generation unit 220.

More specifically, the storage unit 240 may store the configuration information of the existing network.

The acquisition unit 270 refers to the storage unit 240, and if the configuration information of the existing network is registered in the storage unit 240, acquires the configuration information from the storage unit 240. In this case, the acquisition unit 270 transmits an information request notification to the new functional unit but does not transmit the information request notification to the existing functional units.

The generation unit 220 generates configuration information for the new network based on the functional unit information of the new functional unit received from the acquisition unit 270 and the configuration information of the existing network. Specifically, the generation unit 220 generates configuration information for the new network by modifying the configuration information of the existing network acquired from the storage unit 240 using the functional unit information of the new functional unit. The generation unit 220 updates the configuration information in the storage unit 240 with the newly generated configuration information.

Setting Processing Unit

The setting processing unit 230 acquires, from a database in the storage device, feasibility information that corresponds to the configuration information of the new network generated by the generation unit 220 and that indicates the feasibility of the new network.

More specifically, the setting processing unit 230 acquires, as the feasibility information, for example, success/failure information indicating the success/failure of the new network, and setting information indicating setting content for performing communication in the new network.

Figure 8:
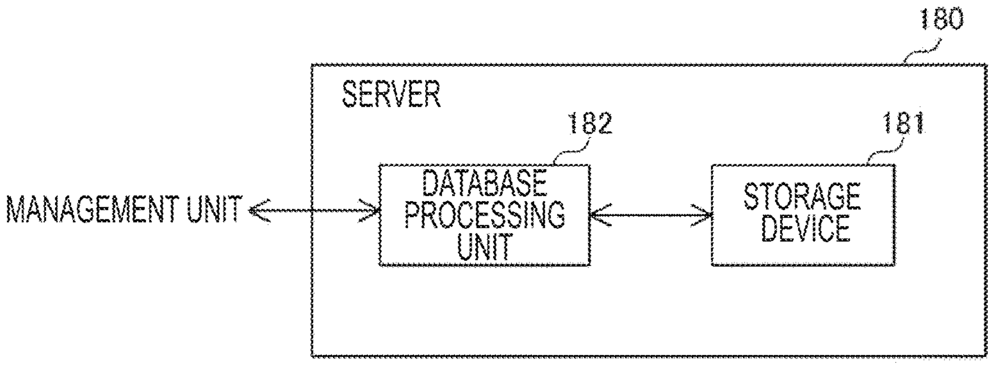
FIG. 8 is a diagram illustrating a configuration of a server in the communication system according to the embodiment of the present disclosure.

FIG. 8 is a diagram illustrating the configuration of the server in the communication system according to the embodiment of the present disclosure.

As shown in FIG. 8, the server 180 includes a storage device 181 and a database processing unit 182. The database processing unit 182 is realized by, for example, a processing circuit (circuitry) that includes one or more processors. The storage device 181 is, for example, a non-volatile memory included in the processing circuit.

For example, the storage device 181 stores a success/failure database in which configuration information of the network 12 is associated with success/failure information indicating the success or failure of the network 12.

As shown in FIGS. 4 and 8, upon receiving configuration information of a new network from the generation unit 220, the setting processing unit 230 performs communication with the server 180 via the TCU 111A to acquire success/failure information corresponding to the configuration information from the success/failure database in the storage device 181.

More specifically, the setting processing unit 230 transmits the configuration information received from the generation unit 220 to the database processing unit 182 in the server 180.

The database processing unit 182 uses the configuration information received from the setting processing unit 230 as a search key to acquire corresponding success/failure information from the success/failure database. The database processing unit 182 transmits the acquired success/failure information to the setting processing unit 230.

FIG. 9 is a diagram illustrating an example of the success/failure database stored in the storage device in the communication system according to the embodiment of the present disclosure.

In the following, it is assumed that the IDs of the applications 100A, 100B, 100C, 100D, 100E, 100F, 100G, 100H, and 100J are "ID-A", "ID-B", "ID-C", "ID-D", "ID-E", "ID-F", "ID-G", "ID-H", and "ID-J", respectively.

The feasibility information is information indicating a plurality of combinations of the functional unit information of in-vehicle functional units, the functional unit information of new functional units, and the feasibility of the new network.

Specifically, as shown in FIG. 9, the success/failure database in the storage device 181 stores, in association with each other, a configuration ID, configuration information (a combination of vehicle information, the IDs of the applications 100 in the existing network, and the ID of the application 100 to be added), and success/failure information of the new network represented by the configuration information.

Note that in this example, for convenience, it is assumed that the topology of the hardware devices, the bandwidth of the communication paths between the hardware devices, and the like can be specified based on the vehicle information and the ID of the application 100.

In the success/failure database, the success/failure information indicates, for example, "success" or "failure".

In the success/failure database, when the success/failure information corresponding to the configuration information of a new network indicates "success", it means that the new network can be constructed; when the success/failure information indicates "failure", it means that the new network cannot be constructed; and "unverified" in the success/failure database means that the success/failure of the new network has not been verified and no success/failure information exists.

For example, the database processing unit 182 receives, from the setting processing unit 230, configuration information indicating that the manufacturer of the vehicle 1 is "Company A", the model is "aaaa", the IDs of the applications 100 in the existing network are "IDA", "ID-B", and "ID-C", and the ID of the application 100 to be added is "ID-G". The database processing unit 182 then uses the received configuration information as a search key to acquire success/failure information, which indicates "success", from the success/failure database, and transmits the acquired success/failure information to the setting processing unit 230.

For example, when feasibility information is acquired from the database in the storage device 181 as described above, the setting processing unit 230 of the management unit 200 registers the configuration information generated by the generation unit 220 and the feasibility information corresponding to the configuration information in the storage unit 240.

Also, for example, the setting processing unit 230 further acquires setting information indicating setting content for performing communication in the new network.

More specifically, the setting processing unit 230 acquires setting information indicating the setting content of the functional units for performing communication at layer 4 or lower in the OSI (Open Systems Interconnection) reference model in the new network.

For example, the storage device 181 of the server 180 stores a setting database in which configuration information of the network 12 is associated with the setting content of the functional units in the network 12.

FIG. 10 is a diagram illustrating an example of the setting database stored in the storage device in the communication system according to the embodiment of the present disclosure.

In the following description, for convenience, the port numbers of the communication ports 120A, 120B, and 120C of the relay device 112 are assumed to be "1", "2", and "3", respectively. Moreover, each of the in-vehicle ECUs 111 has one communication port, and the port number of the communication port is set to "1".

As shown in FIG. 10, in the setting database in storage device 181, for example, a configuration ID is registered in association with the setting content (e.g., a VLAN ID for each communication port 120) of the functional units in the network 12 indicated by the configuration ID. Hereinafter, the VLAN ID will also be referred to as "VID".

As shown in FIGS. 9 and 10, upon acquiring success/failure information indicating "success" from the success/failure database as success/failure information corresponding to the configuration information having the configuration ID "00001", the database processing unit 182 acquires the VIDs of the functional units from the setting database as the setting information having the configuration ID "00001".

For example, the success/failure information in the success/failure database and the setting information in the setting database are generated based on the results of prior verification taking into consideration the logical configuration and the physical configuration of the network indicated by the pieces of configuration information.

The database processing unit 182 transmits the acquired setting information to the setting processing unit 230 of the management unit 200.

Operation Example 1

In the case of acquiring setting information and success/failure information indicating "success" as the feasibility information, the setting processing unit 230 outputs the acquired success/failure information and setting information to the notification unit 250.

Upon receiving the feasibility information from the setting processing unit 230, the notification unit 250 notifies at least one of the functional units in the new network of setting content for performing communication in the new network, based on the received feasibility information.

More specifically, the notification unit 250 specifies a functional unit whose setting content needs to be changed in order to perform communication in the new network, from among the one or more existing functional units included in the existing network and the new functional unit, and notifies setting content to the specified functional unit.

For example, upon receiving the setting information from the setting processing unit 230, the notification unit 250 acquires, from the storage unit 240, setting information indicating the setting content of the functional units in the existing network. The notification unit 250 then compares the setting information received from the setting processing unit 230 with the setting information acquired from the storage unit 240, and specifies one or more functional units whose setting content needs to be changed in order to perform communication in the new network. The notification unit 250 transmits the setting information received from the setting processing unit 230 to the one or more specified functional units.

In the case where, for example, there is no functional unit whose setting content needs to be changed in the new network, the notification unit 250 does not transmit the setting information to any functional unit.

Upon receiving the setting information from the notification unit 250, the one or more functional units in the new network change a corresponding setting based on the received setting information. The functional units in the new network perform communication with each other in accordance with the changed setting content.

For example, in the example shown in FIG. 10, the setting processing unit 230 acquires setting information indicating that the ID of the VLAN to which the image sensor 111G, which includes the new functional unit application 100G, belongs is "VLAN 20", and that the IDs of the VLANs corresponding to the communication port 120C of the relay device 112 that includes the application 100F are "VLAN 20, VLAN 30".

The setting processing unit 230 outputs the acquired setting information to the notification unit 250. Based on the setting information received from the setting processing unit 230, the notification unit 250 notifies the setting content to the image sensor 111G and other units (not shown) in the relay device 112.

Figure 11:
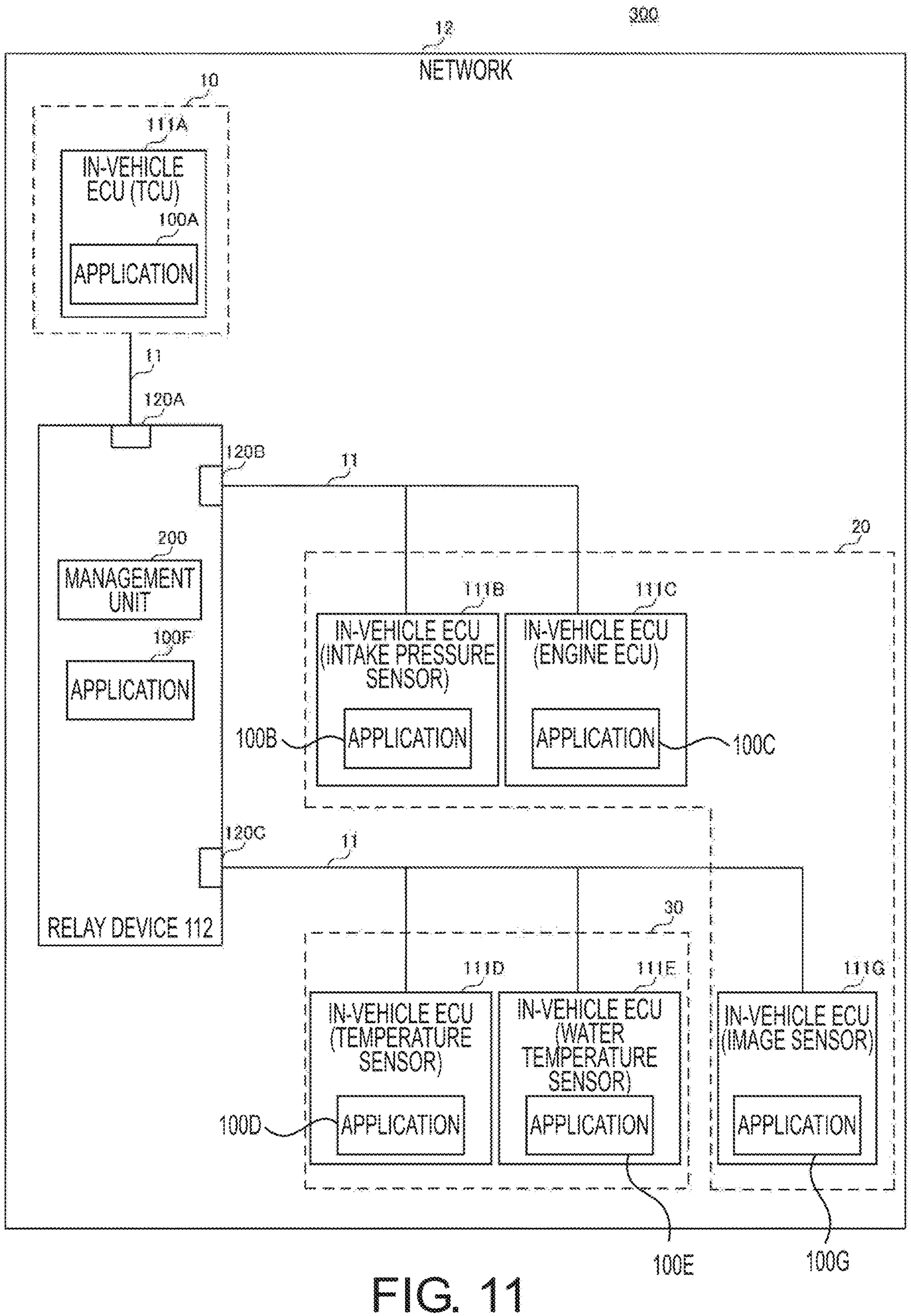
FIG. 11 is a diagram illustrating another example of a configuration of a new network after a setting change in the vehicle communication system according to the embodiment of the present disclosure.

FIG. 11 is a diagram illustrating another example of the configuration of a new network after a setting change in the vehicle communication system according to the embodiment of the present disclosure.

As shown in FIG. 11, in the new network shown in FIG. 5, the image sensor 111G and the relay device 112 change a corresponding setting based on the setting content notified by the notification unit 250. The image sensor 111G is thus able to perform communication in the VLAN 20.

Operation Example 2

In the case of acquiring success/failure information indicating "failure" as the feasibility information, the setting processing unit 230 outputs the acquired success/failure information to the generation unit 220.

Upon receiving success/failure information indicating "failure" as the feasibility information from the setting processing unit 230, the generation unit 220 changes a generation condition based on the received feasibility information, and generates new configuration information according to the changed generation condition.

For example, the generation unit 220 changes the current generation conditions to generation conditions according to which one or more new functional units are not added to the network 12, and generates new configuration information for the new network in accordance with the changed generation conditions.

As another example, the generation unit 220 changes a generation condition by changing the functional arrangement between the functional units under the current generation conditions, and generates new configuration information for a new network in accordance with the changed generation conditions.

The generation unit 220 outputs the configuration information of the newly generated new network to the setting processing unit 230.

Upon receiving the configuration information newly generated by the generation unit 220, the setting processing unit 230 acquires success/failure information corresponding to the received configuration information from the success/failure database in the storage device 181.

Acquisition of Target Information Using Candidate Information

In the case where functional unit information of a new functional unit whose addition was detected by the detection unit 210 (hereinafter also referred to as target information) cannot be acquired from the new functional unit, the acquisition unit 270 transmits candidate information indicating target information candidates, that is to say the functional unit information of functional units that have a possibility of being connected. The acquisition unit 270 then acquires the target information by receiving a selection result indicating a candidate indicated by the transmitted candidate information.

FIG. 12 is a diagram illustrating an example of provisional configuration information of a network generated by the management unit according to the embodiment of the present disclosure.

The acquisition unit 270 acquires candidate information that is based on the acquired functional unit information of the in-vehicle functional units, that is to say the functional unit information of the existing functional units.

For example, the acquisition unit 270 generates provisional configuration information for the network 12 based on the acquired functional unit information of the existing functional units, and acquires candidate information that is based on the provisional configuration information and feasibility information indicating the feasibility of the new network.

More specifically, if target information does not arrive from a new functional unit within a predetermined time after transmitting the information request notification, the acquisition unit 270 determines that the new functional unit does not have a function of transmitting functional unit information, and generates provisional configuration information for the network 12 based on the functional unit information acquired from the existing functional units.

Specifically, as shown in FIG. 12, the acquisition unit 270 generates configuration information for the existing network indicating, for example, that the manufacturer of the vehicle 1 is "Company A", the model is "aaaa", and the IDs of the applications 100 in the existing network are "ID-A", "ID-B", and "ID-C". The acquisition unit 270 then transmits the generated configuration information to the database processing unit 182 of the server 180.

FIG. 13 is a diagram illustrating an example of candidate information generated by the management unit according to the embodiment of the present disclosure.

For example, the acquisition unit 270 acquires candidate information that is based on the functional unit information of a new functional unit that corresponds to the provisional configuration information in the feasibility information.

More specifically, as shown in FIG. 13, the database processing unit 182 uses the received configuration information of the existing network as a search key to extract, from the success/failure database, the IDs of applications 100 to be added which correspond to the combination of the manufacturer "Company A" of the vehicle 1, the model "aaaa" of the vehicle, and the IDs "ID-A", "ID-B", and "ID-C" of the applications 100 in the existing network. The database processing unit 182 then transmits a candidate list CL indicating the extracted IDs to the acquisition unit 270.

The acquisition unit 270 transmits the candidate list CL received from the database processing unit 182, which is an example of candidate information, to an input unit 290. The input unit 290 is, for example, an IVI (In-Vehicle Infotainment) system, and one example of the input unit 290 is the in-vehicle ECU 111, which is a navigation device.

Note that the acquisition unit 270 may be configured to download and refer to the content of the success/failure database from the server 180 in order to generate candidate information indicating candidates for, for example, the IDs of the applications 100 that correspond to the generated provisional configuration information.

Also, the acquisition unit 270 may be configured to acquire candidate information that is further based on the added position where the new functional unit is to be added to the network 12. The added position is, for example, the port number of the communication port 120 of the relay device 112 to which the in-vehicle ECU 111 was newly connected. The acquisition unit 270 extracts, from the candidate list CL received from the database processing unit 182, the ID of an application that can be connected to the communication port 120 having the port number corresponding to the added position, and transmits candidate information indicating the extracted ID to the input unit 290.

The navigation device, which is the input unit 290, receives the candidate information from the acquisition unit 270 and performs processing to display, on the screen, the ID of the application indicated by the candidate information and a message prompting the user to select the application.

Figure 14:
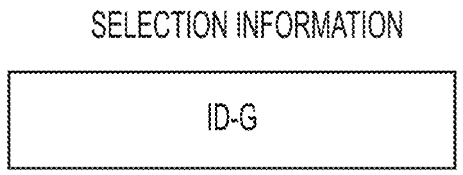
FIG. 14 is a diagram illustrating an example of selection information received by the management unit according to the embodiment of the present disclosure.

FIG. 14 is a diagram illustrating an example of selection information received by the management unit according to the embodiment of the present disclosure.

As shown in FIG. 14, the acquisition unit 270 acquires target information that is based on a user selection result for candidate information.

More specifically, for example, a user who has newly connected an in-vehicle ECU 111 to the network 12 checks the aforementioned screen and performs an operation on the navigation device to select "ID-G", which is the ID of the application 100, as the target information.

The navigation device accepts the target information selection operation performed by the user, and transmits selection information indicating the selection result to the relay device 112.

The acquisition unit 270 of the relay device 112 outputs, to the generation unit 220, the target information indicated by the selection information received from the navigation device.

With this configuration, for example, more accurate target information can be acquired using input from the user who added the functional unit.

Note that the input unit 290 is not limited to a navigation device, and may be a mobile terminal of a user in the vehicle 1, or may be a device outside the vehicle 1 such as the server 180.

FIG. 15 is a diagram illustrating an example of configuration information of a new network generated by the management unit according to the embodiment of the present disclosure.

As shown in FIG. 15, the generation unit 220 generates configuration information for a new network indicating a combination of vehicle information, the IDs of the applications 100 in the existing network, and the ID of the application 100 to be added. Specifically, the generation unit 220 generates configuration information indicating that the manufacturer of the vehicle 1 is "Company A", the model is "aaaa", the IDs of the applications 100 in the existing network are "ID-A", "ID-B", and "ID-C", and the ID of the application 100 to be added is "ID-G".

Operation Flow

Figure 16:
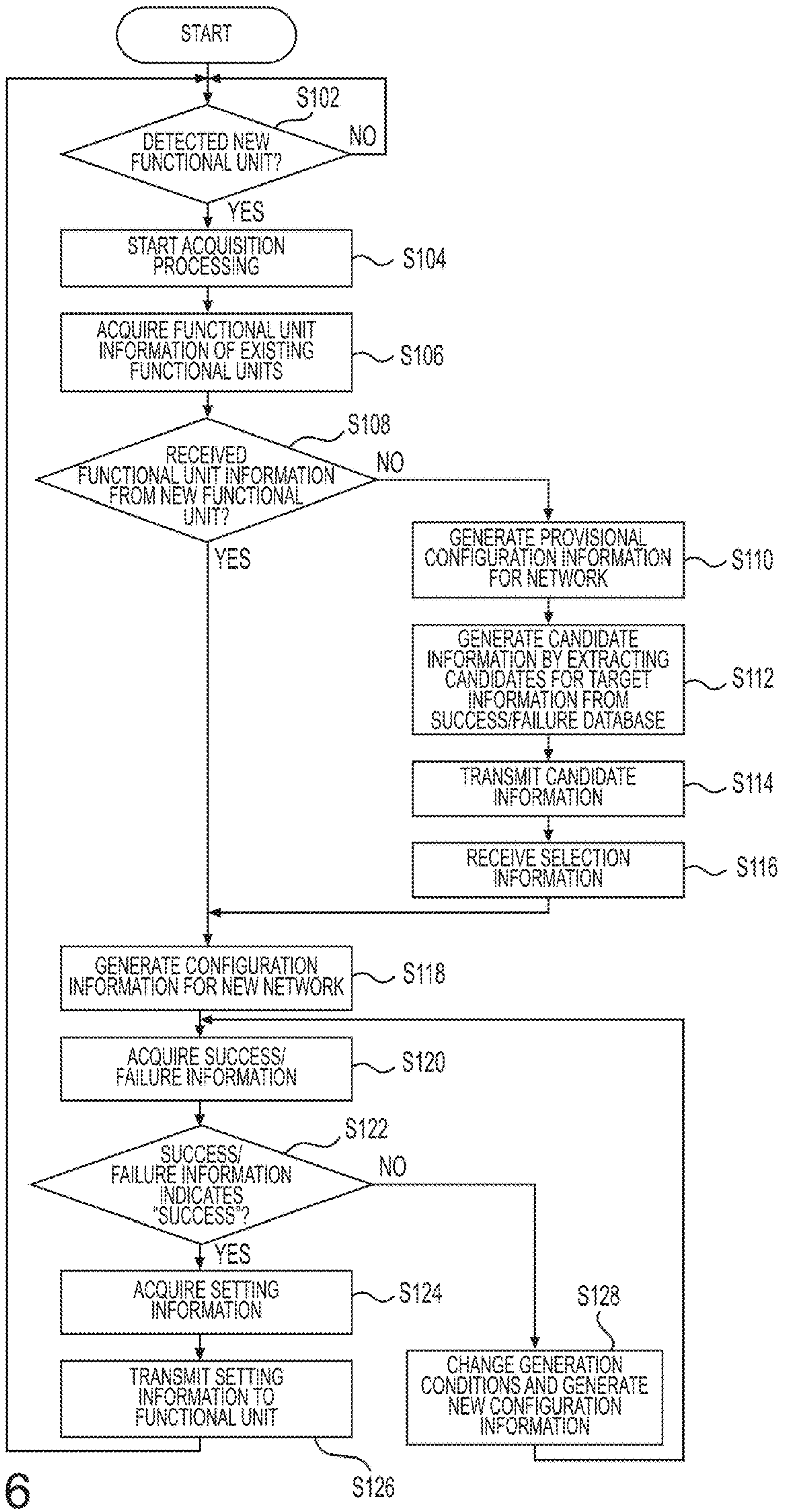
FIG. 16 is a flowchart defining an operation procedure when the management unit constructs a new network in the communication system according to the embodiment of the present disclosure.

FIG. 16 is a flowchart defining an operation procedure when the management unit constructs a new network in the communication system according to the embodiment of the present disclosure.

As shown in FIG. 16, first, the management unit 200 waits for the addition of a new functional unit to the network 12 (NO in step S102), and upon detecting a new functional unit (YES in step S102), starts processing for acquiring the functional unit information of the detected new functional unit and the functional unit information of existing functional units (step S104).

Next, the management unit 200 acquires the functional unit information of the existing functional units by transmitting an information request notification (step S106), and if functional unit information is received from the new functional unit within a predetermined time after transmitting the information request notification (YES in step S108), generates configuration information for a new network based on the functional unit information acquired from the new functional unit and the existing functional units (step S118).

On the other hand, if functional unit information is not received from the new functional unit even after the predetermined time has elapsed since transmission of the information request notification (NO in step S108), the management unit 200 generates provisional configuration information for the network 12 based on the functional unit information acquired from the existing functional units, and transmits the generated configuration information to the database processing unit 182 of the server 180 (step S110).

Next, the management unit 200 receives the candidate list CL indicating IDs extracted from the success/failure database from the database processing unit 182, and generates candidate information that is based on the candidate list CL (step S112).

Next, the management unit 200 transmits the generated candidate information to the input unit 290 (step S114).

Next, the management unit 200 receives selection information indicating the selection result of a candidate indicated by the candidate information from the input unit 290 (step S116).

Next, the management unit 200 generates configuration information for the new network based on the target information indicated by the received selection information and the functional unit information of the existing functional units (step S118).

Next, the management unit 200 acquires success/failure information corresponding to the generated configuration information from the success/failure database in the storage device 181 of the server 180 (step S120).

Next, if the acquired success/failure information indicates "success" (YES in step S122), the management unit 200 acquires, from the setting database in the storage device 181 of the server 180, setting information indicating setting content for performing communication in the new network (step S124).

Next, the management unit 200 transmits the acquired setting information to one or more functional units in the new network (step S126).

Next, the management unit 200 waits for the addition of a new functional unit to the new network (NO in step S102).

On the other hand, if the acquired success/failure information indicates "failure" (NO in step S122), the management unit 200 changes the configuration information generation conditions and generates new configuration information in accordance with the changed generation conditions (step S128).

Next, the management unit 200 acquires success/failure information corresponding to the newly generated configuration information from the success/failure database in the storage device 181 of the server 180 (step S120).

Figure 17:
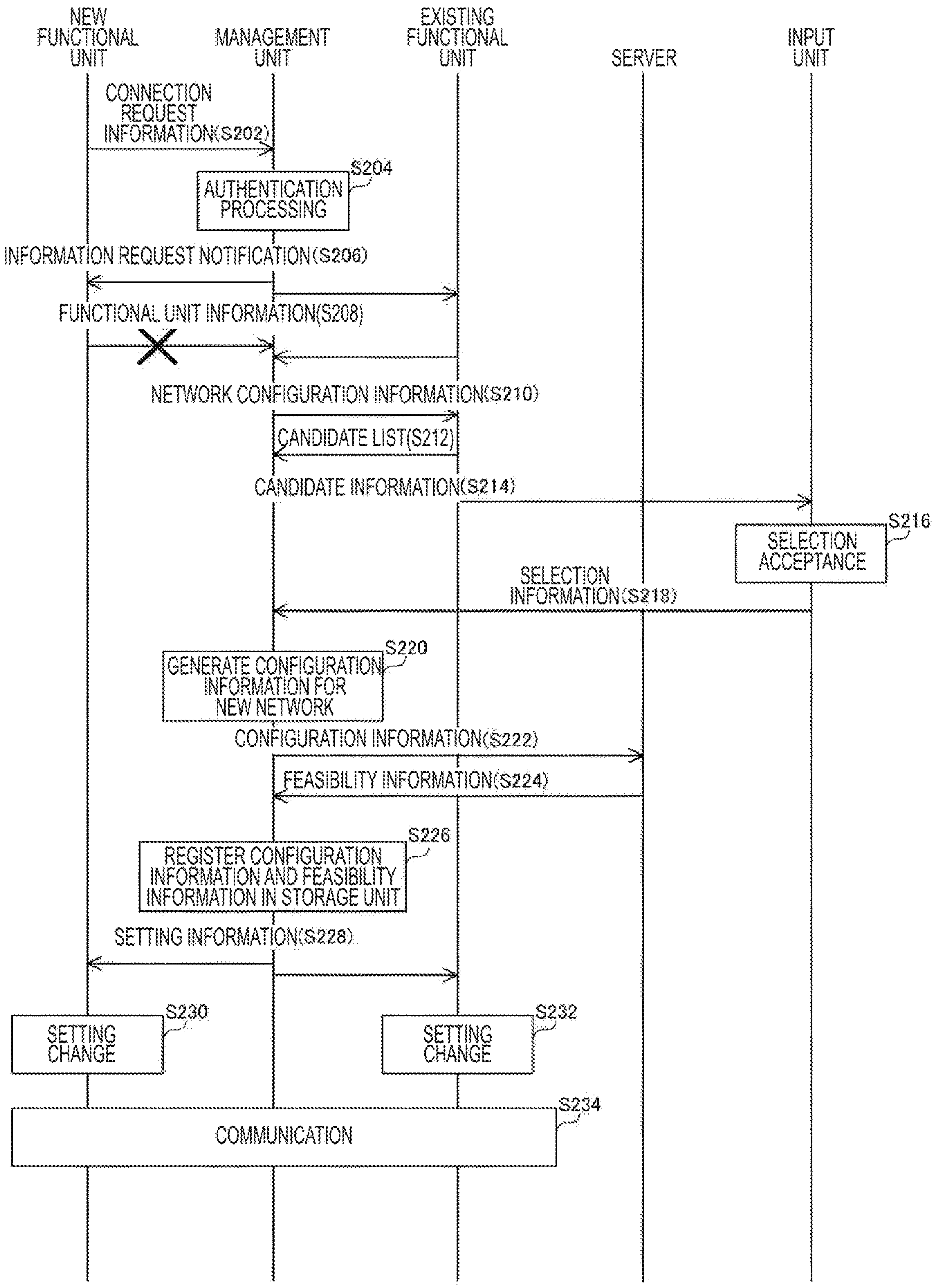
FIG. 17 is a diagram illustrating an example of a sequence of processing for constructing a new network in the communication system according to the embodiment of the present disclosure.

FIG. 17 is a diagram illustrating an example of a sequence of processing for constructing a new network in the communication system according to the embodiment of the present disclosure. FIG. 17 shows processing corresponding to Operation Example 1 described above.

As shown in FIG. 17, first, a new functional unit newly added to the network 12 transmits connection request information to the management unit 200 (step S202).

Next, upon receiving the connection request information from the new functional unit, the management unit 200 detects the new functional unit and performs authentication processing on the new functional unit (step S204).

Next, if the authentication processing performed on the new functional unit is successful, the management unit 200 transmits an information request notification, which is for requesting functional unit information, to the existing functional units and the new functional unit (step S206).

Next, in response to the information request notification, the existing functional units transmit, to the management unit 200, the types of functional unit information specified in the information request notification. On the other hand, the new functional unit does not have a function of transmitting functional unit information to the management unit 200, and therefore does not transmit functional unit information (step S208).

Next, since functional unit information is not received from the new functional unit even after a predetermined time has elapsed since transmission of the information request notification, the management unit 200 generates provisional configuration information for the network 12 (e.g., configuration information of an existing network) and transmits the provisional configuration information to the server 180 (step S210).

Next, the management unit 200 receives the candidate list CL from the server 180 (step S212), generates candidate information that is based on the candidate list CL, and transmits the candidate information to the input unit 290 (step S214).

Next, the input unit 290 accepts a target information selection operation performed by the user who, for example, viewed the screen described above (step S216), and transmits selection information indicating the operation result to the management unit 200 (step S218).

Next, the management unit 200 generates configuration information for the new network based on the functional unit information received from the existing functional units and the target information indicated by the selection information received from the input unit 290 (step S220).

Next, the management unit 200 transmits the generated configuration information to the server 180 (step S222).

Next, the server 180 acquires, from the database, feasibility information that corresponds to the configuration information received from the management unit 200 and that indicates the feasibility of the new network, and transmits the acquired feasibility information to the management unit 200 (step S224).

Next, the management unit 200 registers the generated configuration information and the feasibility information received from the server 180 in the storage unit 240 (step S226).

Next, if success/failure information indicating "success" and setting information are received as the feasibility information, the management unit 200 transmits the setting information to the existing functional units and the new functional unit (step S228).

Next, the new functional unit changes a corresponding setting based on the setting information received from the management unit 200 (step S230). The existing functional units also change a corresponding setting based on the setting information received from the management unit 200 (step S232).

Next, the new functional unit and the existing functional units in the new network perform communication with each other in accordance with the changed setting content (step S234).

Figure 18:
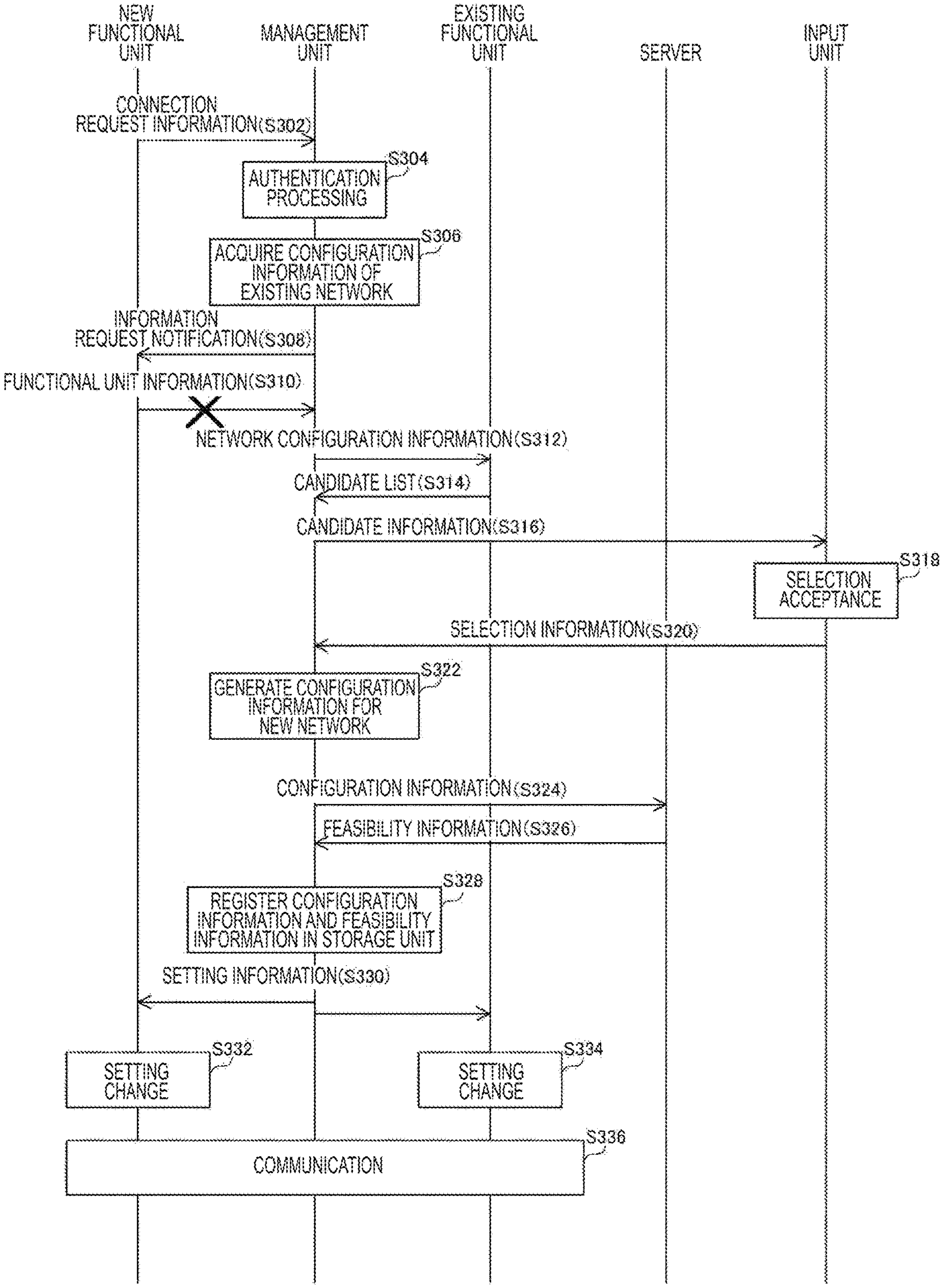
FIG. 18 is a diagram illustrating another example of a sequence of processing for constructing a new network in the communication system according to the embodiment of the present disclosure.

FIG. 18 is a diagram illustrating another example of a sequence of processing for constructing a new network in the communication system according to the embodiment of the present disclosure. FIG. 18 shows processing corresponding to Operation Example 1 described above.

As shown in FIG. 18, first, a new functional unit newly added to the network 12 transmits connection request information to the management unit 200 (step S302).

Next, upon receiving the connection request information from the new functional unit, the management unit 200 detects the new functional unit and performs authentication processing on the new functional unit (step S304).

Next, if the authentication processing performed on the new functional unit is successful, the management unit 200 acquires configuration information of the existing network from the storage unit 240 (step S306), and transmits an information request notification, which is for requesting functional unit information, to the new functional unit (step S308).

Next, the new functional unit does not have a function of transmitting functional unit information to the management unit 200, and therefore does not transmit functional unit information (step S310).

Next, since functional unit information is not received from the new functional unit even after a predetermined time has elapsed since transmission of the information request notification, the management unit 200 generates provisional configuration information for the network 12 (e.g., configuration information of an existing network) and transmits the provisional configuration information to the server 180 (step S312).

Next, the management unit 200 receives the candidate list CL from the server 180 (step S314), generates candidate information that is based on the candidate list CL, and transmits the candidate information to the input unit 290 (step S316).

Next, the input unit 290 accepts a target information selection operation performed by the user who, for example, viewed the screen described above (step S318), and transmits selection information indicating the operation result to the management unit 200 (step S320).

Next, the management unit 200 generates configuration information for a new network based on the target information indicated by the selection information received from the input unit 290 and the configuration information acquired from the storage unit 240 (step S322).

The processing of steps S324 to S336 is similar to that of steps S222 to S234 in FIG. 17.

Figure 19:
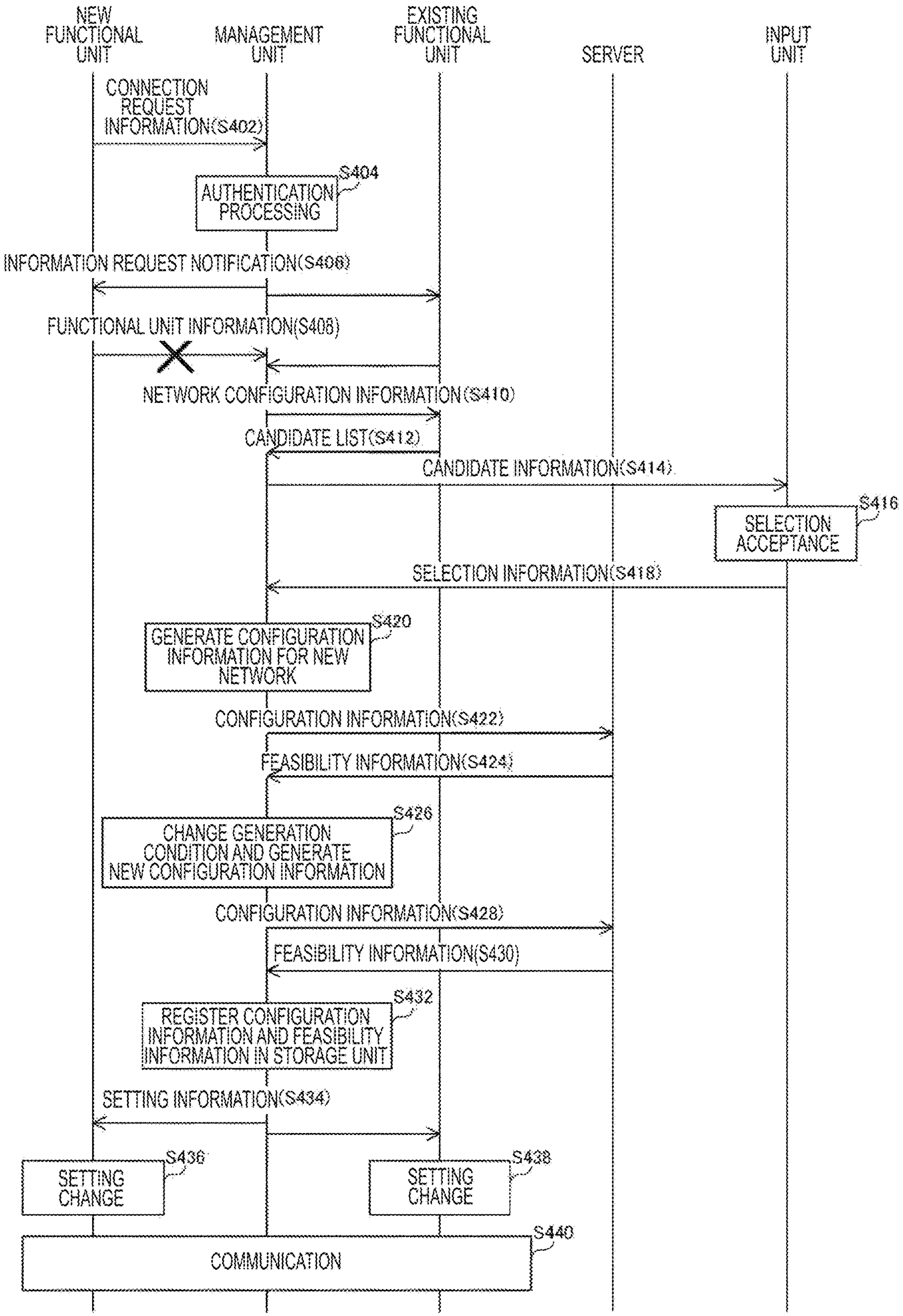
FIG. 19 is a diagram illustrating another example of a sequence of processing for constructing a new network in the communication system according to the embodiment of the present disclosure.

FIG. 19 is a diagram illustrating another example of a sequence of processing for constructing a new network in the communication system according to the embodiment of the present disclosure. FIG. 19 shows processing corresponding to Operation Example 2 described above.

The processing of steps S402 to S424 in FIG. 19 is similar to the processing of steps S202 to S224 in FIG. 17.

Next, if the feasibility information includes success/failure information indicating "failure", the management unit 200 changes the configuration information generation conditions, and generates new configuration information in accordance with the changed generation conditions (step S426).

Next, the management unit 200 transmits the newly generated configuration information to the server 180 via the wireless base station device 161 (step S428).

Next, the server 180 acquires, from the database, feasibility information that corresponds to the configuration information received from the management unit 200 and that indicates the feasibility of the new network, and transmits the acquired feasibility information to the management unit 200 via the wireless base station device 161 (step S430).

The processing of steps S432 to S440 is similar to that of steps S226 to S234 in FIG. 17.

Note that in the management unit 200 according to the embodiment of the present disclosure, the acquisition unit 270 is configured to acquire candidate information that is based on functional unit information acquired from in-vehicle functional units, but the present disclosure is not limited to this. The acquisition unit 270 may be configured to transmit, to the input unit 290, not only functional unit information acquired from existing functional units, but also candidate information whose content is fixed, for example.

Also, in the management unit 200 according to the embodiment of the present disclosure, the acquisition unit 270 is configured to acquire candidate information that is based on provisional configuration information and feasibility information indicating the feasibility of the new network, but the present disclosure is not limited to this. The acquisition unit 270 may be configured to acquire candidate information using information other than information from the success/failure database.

Also, in the management unit 200 according to the embodiment of the present disclosure, when an in-vehicle ECU 111 or an external device is added to the network 12, the detection unit 210 is configured to detect the application 100 included in the in-vehicle ECU 111 or the external device as a new functional unit, but the present disclosure is not limited to this. The detection unit 210 may be configured to detect, as a new functional unit, an in-vehicle ECU 111 or an external device that is to be added to the network 12 but does not include an application 100.

Also, in the management unit 200 according to the embodiment of the present disclosure, upon receiving success/failure information indicating "failure" from the setting processing unit 230, the generation unit 220 changes the configuration information generation conditions and generates new configuration information in accordance with the changed generation conditions, but the present disclosure is not limited to this. The generation unit 220 may be configured to not generate new configuration information even when success/failure information indicating "failure" is received. In this case, for example, the notification unit 250 notifies the new functional unit that the new functional unit will not be added to the network 12.

Furthermore, in the management unit 200 according to the embodiment of the present disclosure, the generation unit 220 is configured to, upon acquiring configuration information of the existing network from the storage unit 240, generate configuration information for a new network based on the functional unit information of the new functional unit and the acquired configuration information of the existing network, but the present disclosure is not limited to this. The generation unit 220 may be configured such that, even when the configuration information of the existing network is acquired from the storage unit 240, depending on the content of the functional unit information of the new functional unit, the generation unit 220 acquires functional unit information from one or more existing functional units and generates configuration information for the new network based on the functional unit information of the new functional unit, the functional unit information of the one or more existing functional units, and the acquired configuration information of the existing network.

Furthermore, in the management unit 200 according to the embodiment of the present disclosure, the notification unit 250 is configured to specify a functional unit whose setting content needs to be changed from among the one or more existing functional units included in the existing network and the new functional unit, and to notify setting content to the specified functional unit, but the present disclosure is not limited to this. The notification unit 250 may be configured to not specify a functional unit whose setting content needs to be changed, but rather notify setting content to all of the functional units in the new network.

Also, the communication system 400 according to the embodiment of the present disclosure has a configuration in which the management unit 200 is included in the relay device 112 in the network 12, but the present disclosure is not limited to this. Some or all of the units in the management unit 200 may be included in a device other than the relay device 112 in the network 12, or may be provided outside the network 12. Note that with a configuration in which, for example, the management unit 200 is included in the relay device 112 in a star topology as shown in FIG. 2, the management unit 200 can perform the above-described processing steps more efficiently.

Furthermore, a configuration is possible in which the management unit 200 does not include the setting processing unit 230 and the notification unit 250. Furthermore, a configuration is possible in which the storage unit 240 is provided outside the relay device 112, which is an example of the management device.

The management unit 200 may also be realized by the server 180. In this case, some or all of the functions of the management unit 200 according to the embodiment of the present disclosure may be provided by cloud computing. In other words, the management unit 200 according to the embodiment of the present disclosure may be configured by a plurality of cloud servers or the like.

Meanwhile, there is demand for technology that allows for the flexible construction of a network with a new configuration while maintaining stable operation in the network.

For example, when constructing a new network by adding a new functional unit to a network, there are cases where communication required by an upper layer cannot be realized due to the network configuration and constraints of a lower layer.

An example of such a network configuration and constraints in a lower layer is a constraint on the communication band in the physical layer. In particular, in a network where low cost is required, such as a network that includes in-vehicle functional units such as in-vehicle ECUs, the above-mentioned communication bandwidth constraint may make it difficult to add a new functional unit to the network while maintaining stable operation in the network.

In contrast, with the relay device according to the embodiment of the present disclosure, due to having the above-described configuration, a new network can be constructed using verification results regarding network feasibility that have been generated in advance. This makes it possible to construct a new network whose feasibility is guaranteed in terms of, for example, logical configuration and physical configuration, thereby making it possible to suppress a delay in important communication that may arise due to, for example, adding a new functional unit to the network.

The processes (functions) of the above-described embodiment are realized by a processing circuit (circuitry) that includes one or more processors. The processing circuit may include, in addition to the one or more processors, an integrated circuit including a combination of one or more memories, various analog circuits, and various digital circuits, for example. The one or more memories store a program (instructions) that causes the one or more processors to execute the above-described processes. The one or more processors may execute the processes in accordance with the program read from the one or more memories, or may execute the processes in accordance with a logic circuit designed in advance to execute the processes. The processors may be any of various processors suitable for control of a computer, such as a central processing unit (CPU), a graphics processing unit (GPU), a digital signal processor (DSP), a field programmable gate array (FPGA), and an application specific integrated circuit (ASIC). Note that the processors may be physically separated and execute the processes in cooperation with each other. For example, the processors may be installed in physically separated computers and execute the processes in cooperation with each other via a network such as a local area network (LAN), a wide area network (WAN), or the Internet. The program may be installed in a memory from an external server device or the like via a network, or may be distributed in a state of being stored in a recording medium such as a compact disc read only memory (CD-ROM), a digital versatile disk read only memory (DVD-ROM), or a semiconductor essential memory, and installed in the memory from the recording medium.

The above-described embodiments are intended to be considered as examples in all respects and not restrictive. The scope of the present disclosure is indicated by the scope of the claims rather than the meaning described above, and is intended to include all changes within the meaning and scope equivalent to the scope of the claims.

The above description includes the following features.

Supplementary Note 1

A management device including:

a detection unit configured to detect addition of a functional unit to a network including one or more in-vehicle functional units;

an acquisition unit configured to acquire functional unit information of the one or more in-vehicle functional units, acquire target information which is functional unit information of a new functional unit which is the functional unit whose addition was detected by the detection unit, and, in a case in which the target information cannot be acquired from the new functional unit, transmit candidate information indicating a candidate for the target information and acquire the target information by receiving a selection result indicating a candidate indicated by the candidate information; and a generation unit configured to generate configuration information for a new network which is the network further including the new functional unit, based on the functional unit information acquired by the acquisition unit, wherein the acquisition unit transmits the candidate information to a navigation device in the network, and receives the selection result that is based on operation content of an operation performed on the navigation device by a user.

Supplementary Note 2

A management device including:

a processing circuit, the processing circuit being configured to:

detect addition of a functional unit to a network including one or more in-vehicle functional units, acquire functional unit information of the one or more in-vehicle functional units, acquire target information which is functional unit information of a new functional unit which is the functional unit whose addition was detected by the detection unit, and, in a case in which the target information cannot be acquired from the new functional unit, transmit candidate information indicating a candidate for the target information and acquire the target information by receiving a selection result indicating a candidate indicated by the candidate information; and generate configuration information for a new network which is the network further including the new functional unit, based on the acquired functional unit information.

The invention claimed is:

1. A management device comprising:

a processor that is configured to:

detect addition of a functional unit to a network including one or more in-vehicle functional units;

acquire functional unit information of the one or more in-vehicle functional units, acquire target information which is functional unit information of a new functional unit which is the functional unit whose addition was detected, and, when the target information cannot be acquired from the new functional unit, transmit candidate information indicating a candidate for the target information and acquire the target information by receiving a selection result indicating a candidate indicated by the candidate information; and generate configuration information for a new network which is the network further including the new functional unit, based on the functional unit information acquired.

2. The management device according to claim 1, wherein the processor is configured to acquire the candidate information that is based on the functional unit information of the one or more in-vehicle functional units that is acquired.

3. The management device according to claim 2, wherein the processor is configured to:

generate provisional configuration information for the network based on the functional unit information of the one or more in-vehicle functional units acquired, and acquire the candidate information that is based on the provisional configuration information and feasibility information indicating a feasibility of the new network.

4. The management device according to claim 3, wherein:

the feasibility information is information indicating a plurality of combinations of the functional unit information of the one or more in-vehicle functional units, the functional unit information of the new functional unit, and the feasibility of the new network, and the processor is configured to acquire the candidate information that is based on the functional unit information of the new functional unit corresponding to the provisional configuration information in the feasibility information.

5. The management device according to claim 4, wherein the processor is configured to acquire the candidate information that is further based on an added position at which the new functional unit is to be added to the network.

6. The management device according to claim 4, wherein:

the processor is configured to acquire, from a database in a storage device, feasibility information corresponding to the configuration information generated for the new network, the feasibility information indicating a feasibility of the new network.

7. The management device according to claim 3, wherein the processor is configured to acquire the candidate information that is further based on an added position at which the new functional unit is to be added to the network.

8. The management device according to claim 3, wherein:

the processor is configured to acquire, from a database in a storage device, feasibility information corresponding to the configuration information generated for the new network, the feasibility information indicating a feasibility of the new network.

9. The management device according to claim 2, wherein the processor is configured to acquire the candidate information that is further based on an added position at which the new functional unit is to be added to the network.

10. The management device according to claim 9, wherein:

the processor is configured to acquire, from a database in a storage device, feasibility information corresponding to the configuration information generated for the new network, the feasibility information indicating a feasibility of the new network.

11. The management device according to claim 2, wherein:

the processor is configured to acquire, from a database in a storage device, feasibility information corresponding to the configuration information generated for the new network, the feasibility information indicating a feasibility of the new network.

12. The management device according to claim 1, wherein:

the processor is configured to acquire, from a database in a storage device, feasibility information corresponding to the configuration information generated for the new network, the feasibility information indicating a feasibility of the new network.

13. A vehicle communication management method to be used in a management device, the method comprising the steps of:

detecting addition of a functional unit to a network including one or more in-vehicle functional units;

acquiring functional unit information of the one or more in-vehicle functional units, acquiring target information which is functional unit information of a new functional unit which is the functional unit whose addition was detected, and, when the target information cannot be acquired from the new functional unit, transmitting candidate information indicating a candidate for the target information and acquiring the target information by receiving a selection result indicating a candidate indicated by the candidate information; and generating configuration information for a new network which is the network further including the new functional unit, based on the acquired functional unit information.

14. A non-transitory storage medium that stores a vehicle communication management program to be used in a management device, the program causing a processor to:

detect addition of a functional unit to a network including one or more in-vehicle functional units;

acquire functional unit information of the one or more in-vehicle functional units, acquire target information which is functional unit information of a new functional unit which is the functional unit whose addition was detected, and, when the target information cannot be acquired from the new functional unit, transmit candidate information indicating a candidate for the target information and acquire the target information by receiving a selection result indicating a candidate indicated by the candidate information; and generate configuration information for a new network which is the network further including the new functional unit, based on the functional unit information acquired.

* * * * *